(12) United States Patent
Guo et al.

(10) Patent No.: US 11,328,589 B2
(45) Date of Patent: May 10, 2022

(54) ADAPTIVE CONTROL OF VEHICULAR TRAFFIC

(71) Applicant: Mitsubishi Electric Research Laboratories, Inc., Cambridge, MA (US)

(72) Inventors: Jianlin Guo, Newton, MA (US); Gilsoo Lee, Blacksburg, VA (US); Kyeong Jin Kim, Lexington, MA (US); Philip Orlik, Cambridge, MA (US); Heejin Ahn, Cambridge, MA (US); Stefano Di Cairano, Newton, MA (US)

(73) Assignee: Mitsubishi Electric Research Labroatories, Inc., Cambridge, MA (US)

( * ) Notice: Subject to any disclaimer, the term of this patent is extended or adjusted under 35 U.S.C. 154(b) by 291 days.

(21) Appl. No.: 16/775,434

(22) Filed: Jan. 29, 2020

(65) Prior Publication Data
US 2021/0233396 A1  Jul. 29, 2021

(51) Int. Cl.
*G08G 1/081* (2006.01)
*G08G 1/01* (2006.01)
*G06F 17/11* (2006.01)

(52) U.S. Cl.
CPC ........... *G08G 1/081* (2013.01); *G08G 1/0116* (2013.01); *G08G 1/0133* (2013.01); *G08G 1/0141* (2013.01); *G08G 1/0145* (2013.01); *G06F 17/11* (2013.01)

(58) Field of Classification Search
CPC .... G08G 1/081; G08G 1/0116; G08G 1/0133; G08G 1/0141; G08G 1/0145; G08G 1/08; G08G 1/087; G08G 1/096708; G08G 1/096741; G08G 1/096783; G08G 1/096725; G06F 17/11
See application file for complete search history.

(56) References Cited

U.S. PATENT DOCUMENTS 10,304,330 B1 * 5/2019 Broz ...................... G08G 1/052
2016/0370199 A1 * 12/2016 Ralston ............ G08G 1/096844

* cited by examiner

*Primary Examiner* — Daryl C Pope
(74) *Attorney, Agent, or Firm* — Gennadiy Vinokur; Hironori Tsukamoto

(57) ABSTRACT

A traffic control system for controlling traffic at interconnected intersections is provided, where the system comprises a receiver that receives traffic data that indicates states of vehicles approaching an intersection of the interconnected intersections and directions of the vehicles exiting the intersection. Further, the system comprises a processor that determines intersection crossing times and velocities of vehicles approaching the intersection by minimizing at least one of a total travel time or a maximum travel time of the vehicles for crossing the intersection. The contribution of each vehicle of the vehicles approaching the intersection in the at least one of a total travel time or a maximum travel time is weighted based on directions of the vehicles and traffic at next intersection. Further, the system comprises a transmitter that transmits the intersection crossing times and velocities to the vehicles exiting the intersection for controlling the traffic at the interconnected intersections.

20 Claims, 16 Drawing Sheets

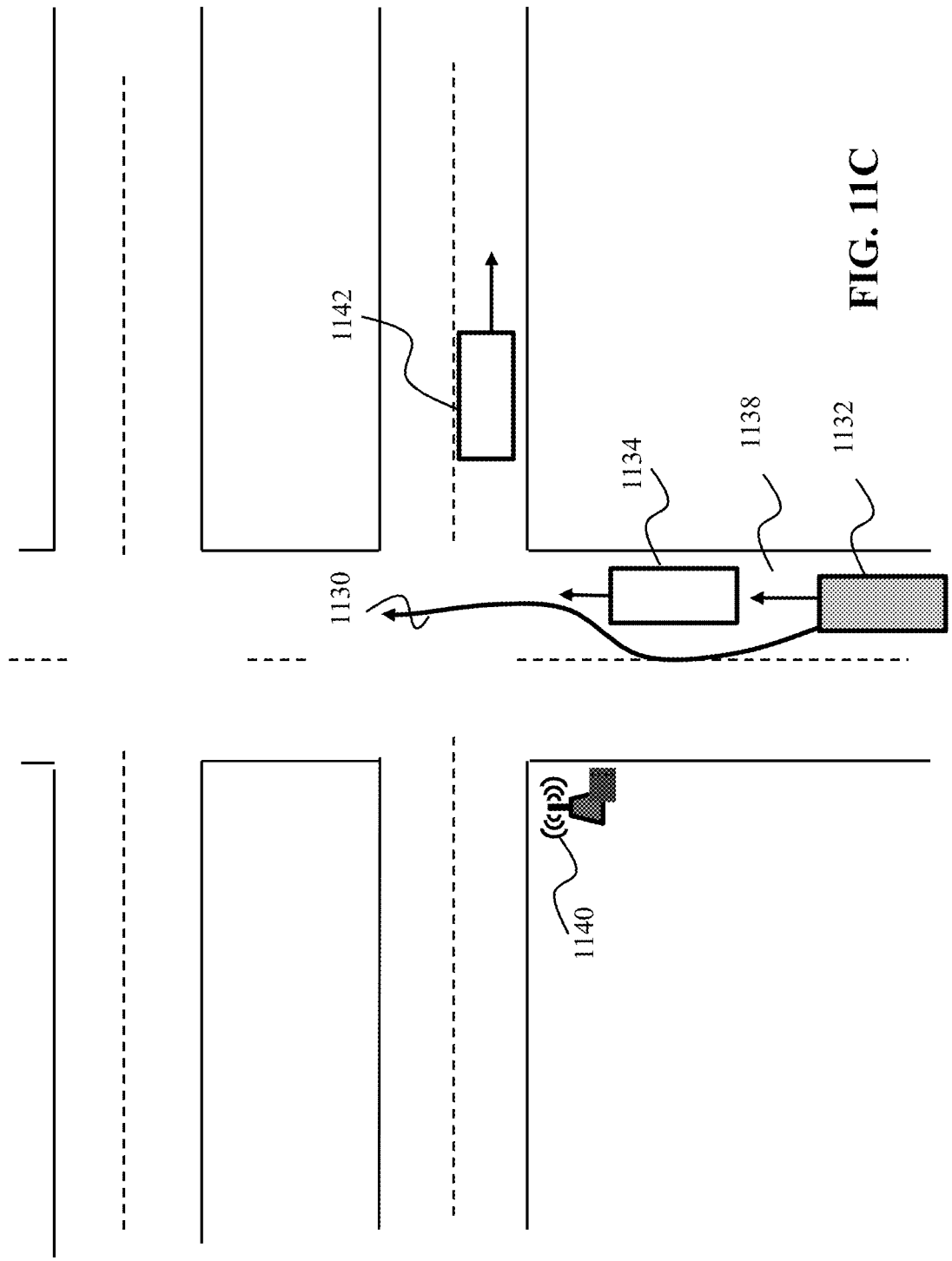

ADAPTIVE CONTROL OF VEHICULAR TRAFFIC

TECHNICAL FIELD

The present invention relates generally to vehicle control, and more particularly to methods and apparatus for adaptive control of vehicular traffic at interconnected intersections.

BACKGROUND

Traffic congestion is a significant problem in many locales throughout the world with costs that include lost hours, environmental threats, and wasted fuel consumption. For instance, the costs of traffic congestion can be measured in hundreds of dollars per capita per year in the United States. To that end, there is a need to reduce traffic congestion and/or improve any other traffic goal. In past, congestion has been improved by changing traffic light timing and building new roads. With the advent of wireless technology and connected components, it has become possible to communicate with vehicles and road infrastructure to make real-time decisions that improve traffic.

For example, Internet of Vehicles (IoV), which is a convergence of mobile Internet and Internet of Things (IoT), enables information gathering, information sharing and information processing to effectively guide and supervise vehicles. The IoV is uniquely different from the IoT because of mobility, safety, Vehicle to Everything (V2X) communication, energy conservation, security attacks, etc. In the IoV, information and communication technologies are applied in the infrastructure, vehicles and users to manage traffic and vehicle mobility. The IoV aims to provide innovative services and control for traffic management and to enable users to be better informed for making safer, more coordinated, and smarter use of transportation networks.

With the development of IoV, vehicles such as connected and autonomous vehicles (CAVs) are also emerging. These types of vehicles are controlled based on advanced technologies using communications, sensors, optimal control techniques, etc. The advance control mechanisms also optimize control efficiency by making real-time optimal control decisions. Further, the emergence of autonomous vehicles has drawn attentions to on-board control of the autonomous vehicles. The on-board control uses communication data, advance devices such as radar, lidar, camera, GPS, etc., and artificial intelligence (AI) technologies to automatically control vehicle mobility.

The rapid development of IoV and CAV has contributed to development of smart city infrastructure or urban transportation system. In the urban transportation system, intersections are crucial area for traffic control. In traffic scenarios, the vehicles are required to frequently stop at traffic congestion at the intersections. The frequent stops at the intersections cause delays that frustrate users of the vehicles. This also increases wastage of fuel as well as increase in pollution. It is also noteworthy that the intersection traffic congestion is also affected by traffic at interconnected intersections. The traffic congestion increases if traffic control at the interconnected intersections is not coordinated.

To that end, there is a need to control vehicular mobility at the intersections to improve the traffic at interconnected intersections. More specifically, there is a need to coordinate traffic control at the interconnected intersections, while preventing the vehicles to halt in order to pass an intersection or a highway merging point. Such traffic congestion may be managed by using model based traffic control through Artificial Intelligence (AI) techniques. However, model based traffic control may be a complicated process. Traffic systems are difficult to model as it requires human involvement. Hence, some methods use data-driven techniques, such as reinforcement learning for the traffic control. However, the data-driven techniques represent aggregation of traffic data in a manner that is difficult to change abruptly in emergency and other situations when there is a need to tune the traffic control.

Accordingly, there is still a need to provide a method for controlling vehicles traveling at interconnected intersections suitable to be adapted and/or tuned to various situations.

SUMMARY

It is an object of some embodiments to provide a system and a method for traffic control for vehicles traveling at roads of interconnected intersections. Additionally, or alternatively, it is another object of some embodiments to optimize control efficiency by making real-time optimal control decisions aimed at reducing traffic congestion on the interconnected intersections. Additionally, or alternatively, it is another object of some embodiments to provide such a control method that is tunable for different traffic situations, conditions, and control objectives.

Additionally, or alternatively, it is another object of some embodiments to optimize control efficiency by making real-time optimal control decisions, while preventing vehicles to stop from crossing the intersection and/or highway merging point. Additionally, or alternatively, it is another object of some embodiments to optimize control efficiency of passing the intersection in consideration of traffic in neighboring intersections.

Some embodiments are based on realization that control, aiming to minimize total travel time of the vehicles crossing an intersection, can reduce traffic congestions and even may allow vehicles to pass the intersection without stopping. Additionally, or alternatively, minimizing a maximum travel time of the vehicles crossing the intersection can also reduce traffic congestions and allow vehicles to pass the intersection without stopping. Some embodiments are based on another realization that control of the vehicles crossing the intersections can be performed by estimating and informing the vehicles about their corresponding intersection crossing times and velocities while entering the intersection. In such a manner, the low-level controllers of the vehicles can be used for crossing the intersection and safety of the crossing can be improved.

Some embodiments are based on realization that tuning of crossing an intersection can be performed by weighing contributions or weights of different vehicles at neighboring intersections. The weights are used in minimizing the total travel time or the maximum travel time of vehicles approaching the intersection. The tuning procedure for estimating the weights of the vehicles can be based on traffic at the next intersection on a direction of a vehicle after the vehicle crosses the intersection. For example, if weight of vehicle A is less than weight of vehicle B, as a result of such a weighted minimization, the vehicle B is more likely to have a priority for crossing the intersection over vehicle A. The weight of the vehicle can be balanced based on destinations of the vehicles after passing the intersection. In such a manner, the weight can be dynamically adapted. In addition, this configuration allows to further modify the weight if necessary, for example, dictated by emergency situation.

To that end, some embodiments minimize the total travel time or maximum travel by solving a mixed integer linear problem (MILP). Some embodiments are based on realization that different vehicles approach the intersection at different times and therefore there is a need to group the vehicles for performing the minimization. There is also need to avoid duplication and/or update of the estimation of the intersection crossing times and velocities of the vehicles. The grouped vehicles enable determining the intersection crossing time and velocity of each vehicle only once even when situation at the roads approaching the intersection changes.

Some embodiments are based on realization that edge devices, such as roadside unit (RSU) are feasible control points to partition roads of an intersection. To that end, some embodiments partition the roads approaching the control point into a sequencing zone and a control zone. The partitioning can be performed by various methods. For example, a road is partitioned based on state of vehicles, road conditions, road geometry. The control zone is adjacent to the intersection and the sequencing zone is adjacent to the control zone. Each zone includes sections of multiple roads on which the vehicles are moving towards the control point, such as the intersection or highway merging point. For each road, the control zone is a section of a road between a starting point of the intersection and ending point of the sequencing zone. Some embodiments determine the intersection crossing times and velocities of vehicles in the sequencing zone. In such a manner, when the vehicles are in the control zone, their intersection crossing times and velocities are known to them and can be used for calculating an optimal trajectory of a vehicle in the control zone ending the motion in the control zone at the intersection crossing time with the intersection crossing velocity. Hence, the intersection crossing times and velocities for the vehicles in the control zone are fixed and not updated.

To consider the intersection crossing times and velocities for the vehicles in the control zone, intersection crossing times and velocities for the vehicles are optimally determined in the sequencing zone. Some embodiments perform such optimization by minimizing weighted total travel time or weighted maximum travel time of the vehicles. In some implementations, to determine the intersection crossing times and velocities of the vehicles in the sequencing zone, the weighted total travel time or the weighted maximum travel time of the vehicles in the sequencing zone and the control zone is minimized while having fixed intersection crossing times and velocities for the vehicles in the control zone.

Some embodiments are based on recognition for a need to determine lengths of the sequencing zone and the control zone. The lengths of the sequencing zone and the control zone can differ for different roads. The sequencing zone and control zone lengths can be adaptive with an upper bound and a lower bound. An upper bound for the control zone length is distance between two adjacent intersections. An upper bound for the sequencing zone length is a distance between two adjacent intersections without the control zone length. A maximum distance required to accelerate a vehicle to a maximum velocity from control zone entering velocity using a maximum acceleration velocity and distance needed to stop the vehicle from the control zone entering velocity using a maximum deceleration velocity, provides a lower bound for the control zone length. Thus, the control zone length must be long enough such that a vehicle can reach any velocity from its control zone entering velocity. The sequencing zone must be long enough such that vehicles can send their status to an edge device, e.g. a road-side unit (RSU) located at the intersection. The RSU can solve a mixed integer linear problem (MILP) to determine intersection crossing times and velocities. The RSU transmits the determined intersection crossing times and velocities to the vehicles. The vehicles determine their optimal motion trajectories for the control zone based on the transmitted intersection crossing times and velocities.

Some embodiments are based on the recognition of the complexity of such a traffic control problem at the interconnected intersections. For example, one of issues addressed by some embodiments is an arrangement of the control system configured for real-time traffic control at the interconnected intersections. For example, some embodiments are based on recognition that the cloud control is impractical to optimally control passing the intersection and/or highway merging point. The cloud control may not meet real-time constraint of the safety requirement due to the multi-hop communication delay. In addition, the cloud does not have instant information of vehicles, pedestrians and road condition to make optimal decision. On the other hand, vehicle on-board control may not have sufficient information to make optimal decision, e.g., on-board control of the vehicle does not have information about object movement out of the visible range and cannot receive information from vehicles outside of the communication range. In addition, the on-board control may also have communication limitation due to the existence of the heterogeneous vehicular communication technologies such as IEEE Short-Range Communications/Wireless Access in Vehicular Environments (DSRC/WAVE) and 3GPP Cellular-Vehicle-to-Anything (C-V2X), e.g., a vehicle equipped with IEEE DSRC/WAVE radio cannot communication with a vehicle equipped with 3GPP C-V2X radio.

To that end, some embodiments are based on realization that the edge devices such as the roadside units (RSUs) are feasible control points to make optimal decision on real-time control of crossing the intersection or highway merging point due to their unique features such as direct communication capability with vehicles, road condition knowledge and environment view via cameras and sensors. In addition, edge devices at a control point such as the intersection or highway merging point can make joint control decision via real time collaboration and information sharing. To that end, some embodiments utilize edge devices to realize real time edge control.

The advance vehicle mobility is controlled by running control methods using effective communication data and sensor data. Vehicular environment is a highly dynamic environment. Besides the vehicular dynamics, there are unpredictable environment dynamics, such emergency situation due to random movement of objects such as pedestrians and animals, sudden events caused by trees and infrastructure. Therefore, the control methods need to be rapidly adaptable to the entire environment dynamics. In other words, control methods must be fast enough to reflect the dynamics of vehicular environment. The runtime of control methods depends on the number of vehicles involved, complexity of control techniques, resources of the control device, etc. The control methods include computation of the intersection crossing times and velocities within a computation time to determine the intersection crossing times and velocities. To guarantee the safety, the computation time needs to be below a threshold. Further, an infrastructure edge device, e.g., DSRC/WAVE RSU and C-V2X eNodeB, referred to hereinafter IoV-Edge is used to control vehicle traffic. The IoV-Edge is equipped with appropriate control techniques, computing resources and communication interfaces. For the IoV-Edge, it is impractical to dynamically update its control techniques and computation resources. However, it is feasible to adjust the number of vehicles involved to reduce the runtime of the control techniques.

Accordingly, one embodiment discloses a traffic control system for controlling traffic at interconnected intersections of roads, which includes a receiver configured to receive traffic data indicative of states of vehicles approaching an intersection of the interconnected intersections and directions of the vehicles exiting the intersection; a processor configured to determine intersection crossing times and velocities of vehicles approaching the intersection by minimizing one of a total travel time of each vehicle of the vehicles or a maximum travel time of each vehicle of the vehicles for crossing the intersection, wherein a contribution of each vehicle of the vehicles approaching the intersection in the one of a total travel time or a maximum travel time is weighted based on direction of the corresponding vehicle and traffic at next intersection, such that the minimization uses different weights for at least two different vehicles of the vehicles approaching the intersection; and a transmitter configured to transmit the intersection crossing times and velocities to the vehicles exiting the intersection for controlling the traffic at the interconnected intersections.

Another embodiment discloses a method for controlling traffic at interconnected intersections of roads, wherein the method uses a processor coupled to a receiver configured to receive traffic data indicative of states of vehicles approaching an intersection of the interconnected intersections and directions of the vehicles exiting the intersection, wherein the processor is coupled with stored instructions implementing the method, wherein the instructions, when executed by the processor carry out steps of the method, which includes determining intersection crossing times and velocities of the vehicles approaching the intersection by minimizing one of a total travel time of each vehicle of the vehicles or a maximum travel time of each vehicle of the vehicles for crossing the intersection, wherein a contribution of each vehicle of the vehicles approaching the intersection in the total travel time or the maximum travel time is weighted based on direction of the corresponding vehicle and traffic at next intersection, such that the minimization uses different weights for at least two different vehicles of the vehicles approaching the intersection; and transmitting the intersection crossing times and velocities to the vehicles exiting the intersection via a transmitter coupled to the processor for controlling the traffic at the interconnected intersections.

Yet another embodiment discloses a non-transitory computer readable storage medium embodied thereon a program executable by a processor for performing a method. The method includes determining intersection crossing times and velocities of vehicles approaching an intersection of interconnected intersections of roads by minimizing one of a total travel time of each vehicle of the vehicles or a maximum travel time of each vehicle of the vehicles crossing the intersection based on traffic data indicative of states of the vehicles approaching the intersection and directions of the vehicles exiting the intersection, wherein a contribution of each vehicle in the total travel time or the maximum travel time is weighted based on direction of the corresponding vehicle and traffic at next intersection, such that the minimization uses different weights for at least two different vehicles of the vehicles approaching the intersection; and transmitting the intersection crossing times and velocities to the vehicles for exiting the intersection via a transmitter coupled to the processor, for controlling the traffic at the interconnected intersections.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 11C shows a schematic for determining optimal trajectory for a vehicle, according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
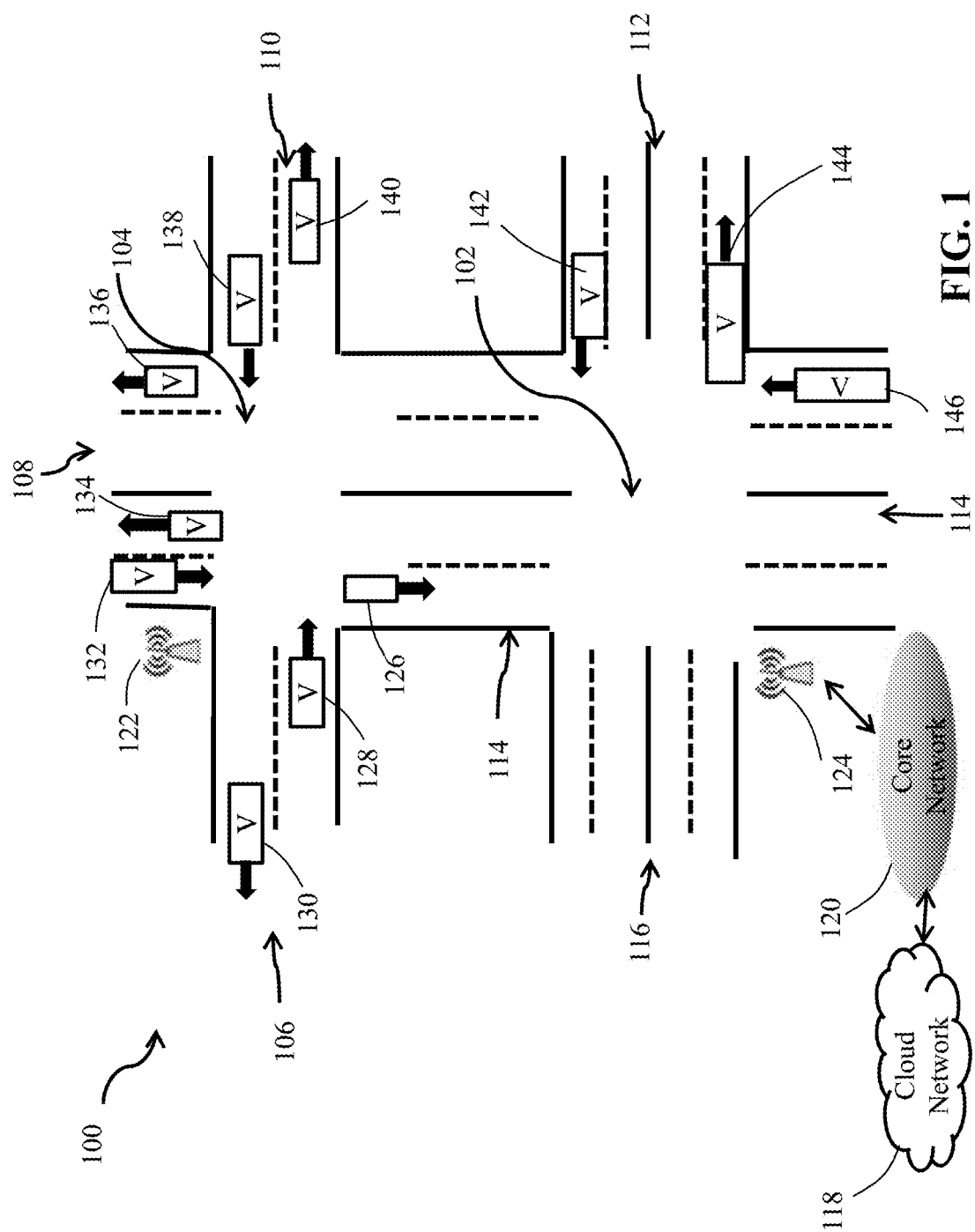
FIG. 1 shows a traffic scenario illustrating traffic problems at interconnected intersections of roads, according to some embodiments.

FIG. 1 shows a traffic scenario 100 illustrating problems at interconnected intersections of roads, according to some embodiments. The interconnected intersection includes physically interconnected intersections and communicably interconnected interconnections. The physically interconnected intersections are intersections where vehicles travel from one intersection to another intersection. The communicably interconnected interconnections are intersections that share traffic information from one intersection to another intersection via communication channels.

The traffic scenario 100 shows an intersection 102 and an intersection 104 which are interconnected to each other, and also called as interconnected intersections of roads 106-116, where vehicles 126-146 are present on the roads 106-116 of the interconnected intersections. The vehicles (e.g., the vehicles 126-146) may be autonomous, semi-autonomous or manually operated vehicle. Some examples of the vehicles 126-146 include two-wheeler vehicles, such as motor bikes, four-wheeler vehicles, such as cars or more than four-wheel vehicles, such as trucks and the like.

There is further shown a road site unit (RSU) 122 and a RSU 124, a core network 120, and a cloud network 118 to establish an Internet of Vehicles (IoV) environment within the set of vehicles 126-146 on the roads 106-116.

In some embodiments, the traffic scenario 100 corresponds to a metropolitan area, where the roads 106-116 form a large number of intersections, such as the intersections 102 and 104. In the metropolitan area, traffic conditions at the intersections 102 and 104 determine traffic flow because traffic congestion usually starts at an intersection (such as the intersection 104) and propagates to the roads (e.g. 106-116). The traffic conditions at the intersections 102 and 104 are interdependent such that a variation at one intersection (i.e. the intersection 104) propagates to other intersections, such as the intersection 102 (also called as a neighboring intersection 102).

Some embodiments are based on a realization that to establish communication among different vehicles (e.g., the set of vehicle 126-146) in the IoV environment, communication between the cloud network 118 and vehicle 126 on the road 114 needs to propagate through the RSU 124 and the core network 120 in such a way that a multi-hop communication is established. In the IoV environment, vehicular mobility of the vehicles 126-146 is controlled using a cloud based network (i.e. the cloud network 118). However, in such a case a multi-hop communication long latency is obtained which leads to impractical real-time control and service by cloud based vehicle control approach using the cloud network 118. More specifically, the multi-hop communication between the cloud network 118 and the vehicle 126 results in long delay, which may not be feasible in real-time scenarios.

In addition, on-board control devices of the vehicles, such as the vehicle 146 cannot obtain information about neighboring vehicles (such as the vehicle 142), pedestrians and environment conditions that are out of their visible range. For instance, the vehicle 146 traveling on the road 114 intends to pass the intersection 102 after the vehicle 144 (that is bigger in size than the vehicle 142) passes the intersection 102, and the vehicle 142 (that is a small sized vehicle) is also moving into the intersection 102. In such a scenario, visibility of the vehicle 142 is blocked by the vehicle 144 as shown in FIG. 1. The vehicle 144 prevents the vehicle 142 from getting noticed by the vehicle 146 if communication link between the vehicle 142 and the vehicle 146 is affected or if vehicle 142 and vehicle 146 use different communication protocols. As a result, the vehicle 142 and the vehicle 146 might collide.

Some embodiments are based on a realization that different communication technologies are utilized to support vehicular communications. For example, IEEE Dedicated Short-Range Communications/Wireless Access in Vehicular Environments (DSRC/WAVE) standard family for vehicular networks, 3GPP Cellular-Vehicle-to-Anything (C-V2X), and the like. However, due to high cost reasons, it is impractical for vehicles (e.g. the vehicles 126-146) to install more than one short range communication technologies which leads to compatibility issues among the vehicle to communicate with each other. Therefore, the vehicles equipped with the IEEE DSRC/WAVE cannot communicate with vehicles equipped with the 3GPP C-V2X, and vice versa. Consequently, accuracy of the vehicle mobility control decision by the on-board control device is severely affected as the vehicle mobility control decision is based on incomplete information of the traffic scenario 100.

Some embodiments are based on a realization that IoV-Edge devices (e.g. the RSU 122 and the RSU 124) for controlling vehicular traffic have advantages in real-time vehicle mobility control over usage of the cloud network and the on-board device. For example, the IoV-Edge devices installed at intersection or highway merging point directly communicate with the vehicles (e.g., the vehicles 126-146) approaching the intersection or merging point, the IoV-Edge devices equipped with multiple communication technologies can communicate with all the vehicles, the IoV-Edge devices are capable to achieve real time collaboration on vehicle states and environment view via robust high speed communication links, the IoV-Edge devices are stationary which enable them in providing reliable communication between the IoV-Edge devices and the vehicles as well as collecting environmental data having higher quality, and the IoV-Edge devices are capable of continuously monitoring vehicle traffic and the environment for accurate decision making. Accordingly, the IoV-Edge devices are appropriate to use for optimal vehicle mobility control decision.

The IoV-Edge devices are implemented based a control point to run control technology for making control decision and provide vehicular traffic control at the interconnected intersections. Thus, selection of the control point is critical in order to perform real time vehicle mobility control. However, controlling vehicle mobility of the vehicles (e.g., the vehicles 126-146) by the cloud network 118 cannot meet the real time vehicle mobility control due to the multi-hop communication delay. In addition, the cloud does not have instant information (i.e., real-time information) of the vehicles 126-146, pedestrians and condition of the roads (e.g. the roads 106-116) to make optimal decision. On-board control does not have comprehensive information to make optimal vehicle mobility control decision. In addition, the on-board control may also have communication limitation due to the existence of the heterogeneous vehicular communication technologies such as the IEEE DSRC/WAVE and the 3GPP C-V2X. The edge devices such as the RSU 122 and the RSU 124 are feasible points to make optimal decision on real time vehicle control due to their direct communication capability, road condition knowledge, environment view, and real rime collaboration capability.

As shown in FIG. 1, traffic at the intersection 102 is controlled by the RSU 124 and traffic at the intersection 104 is controlled by the RSU 122. In case the vehicle 146 crosses the intersection 102 and intends to go straight towards the intersection 104, the vehicle 138 is required to stop at next intersection (i.e., the intersection 104) due to traffic at the intersection 104. When the vehicle 138 stops frequently at such interconnected intersections, driving experience is hindered and fuel consumption is increased.

Some embodiments are based on a realization that Artificial Intelligence (AI) techniques are utilized for controlling such traffic at the intersection 102 and the intersection 104. For instance, in a smart-city infrastructure with urban traffic management system, traffic at such intersections may be controlled using AI model based techniques. Some other embodiments are based on realization that the traffic may be controlled based on inputs provided by a human agent. However, the human agent based traffic control may not be efficient. The human agent may exhibit potentially irrational behavior or provide subjective choices, which may be difficult to quantify, calibrate or justify. The human agent may enhance a traffic control model using data-driven techniques, such as reinforced learning for the traffic control. However, the data-driven based reinforced learning may not be able to provide a seamless traffic control in abrupt situations or emergency cases. For example, the vehicle 146 may stop while crossing the intersection 102 due to battery failure of the vehicle 146. This may cause traffic congestion due to sudden event of the vehicle 146 stopping in the intersection 102. Consequently, traffic congestion occurs at other neighboring intersections, such as the intersection 104. In order to control the sudden traffic congestion, human involvement may be required. For instance, the RSU 124 may immediately transmit an alert signal to a manual operator for the human involvement because the RSU 124 has direct view of the intersection 102.

Therefore, some embodiments of the present invention are based on utilization of edge devices to perform edge computing for realizing real time optimal vehicle control at interconnected intersections (i.e. the intersection 102 and the intersection 104). In this disclosure, the edge devices such as the RSU 122 and RSU 124, or eNodeB are called as an IoV-Edge. The edge computing for controlling traffic at the interconnected intersections using the IoV-Edge is described in FIG. 2.

Figure 2:
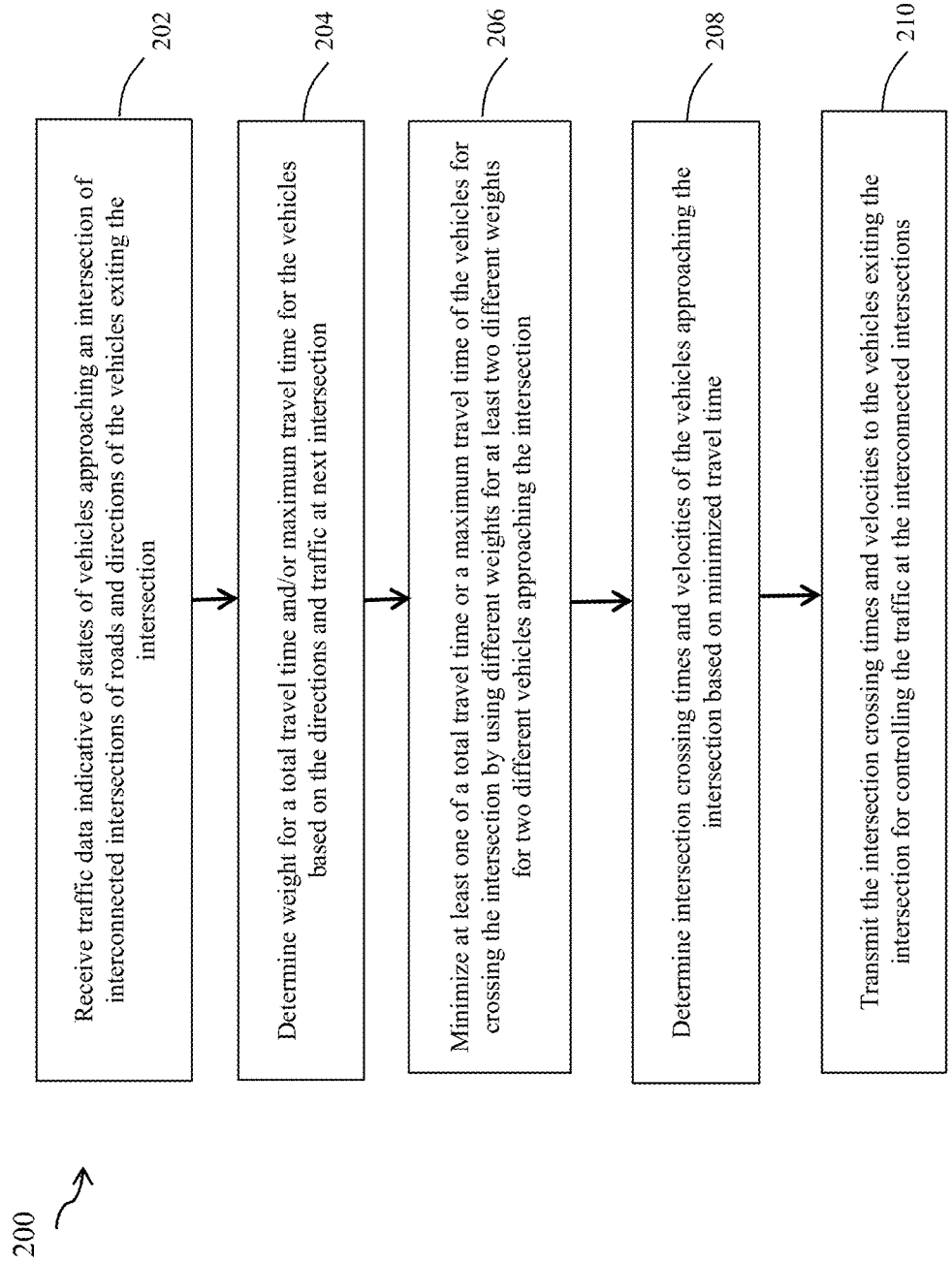
FIG. 2 shows steps of a method for controlling traffic at interconnected intersections of roads, according to some embodiments.

FIG. 2 shows steps of a method 200 for controlling traffic at interconnected intersections of roads, according to some embodiments.

In some embodiments, an IoV-Edge is placed in proximity of each intersection (e.g., the intersection 102 and the intersection 104). Initially, the IoV-Edge receives traffic data at the interconnected intersections at step 202. The IoV-Edge comprises a set of sensors to collect the traffic data. The traffic data represents states of vehicles (e.g., the vehicles 126-146) approaching an intersection of the interconnected intersections and directions of the vehicles exiting the intersection. Some examples of the states of the vehicles include, but not limited to, longitudinal position, velocity, and acceleration of the vehicles. The IoV-Edge then determines weights for the vehicles based on the directions and traffic at next intersection for a total travel time and maximum travel time in step 204. The IoV-Edge collects the next intersection traffic provided by an IoV-Edge of the next intersection. Next, the IoV-Edge minimizes at least one of the total travel time or the maximum travel time of the vehicles for crossing the intersection by using different weights for at least two different weights for two different vehicles approaching the intersection, in step 206. Further, the IoV-Edge determines intersection crossing times and velocities of the vehicles approaching the intersection based on the minimized total travel time or maximum travel time at step 208. At step 210, the intersection crossing times and velocities are transmitted to the vehicles exiting the intersection for controlling the traffic at the interconnected intersections.

In various embodiments, the IoV-Edge generate road data that includes parts of a road approaching an intersection into sections for controlling the interconnected intersections, which is explained next with reference to FIG. 3.

Figure 3:
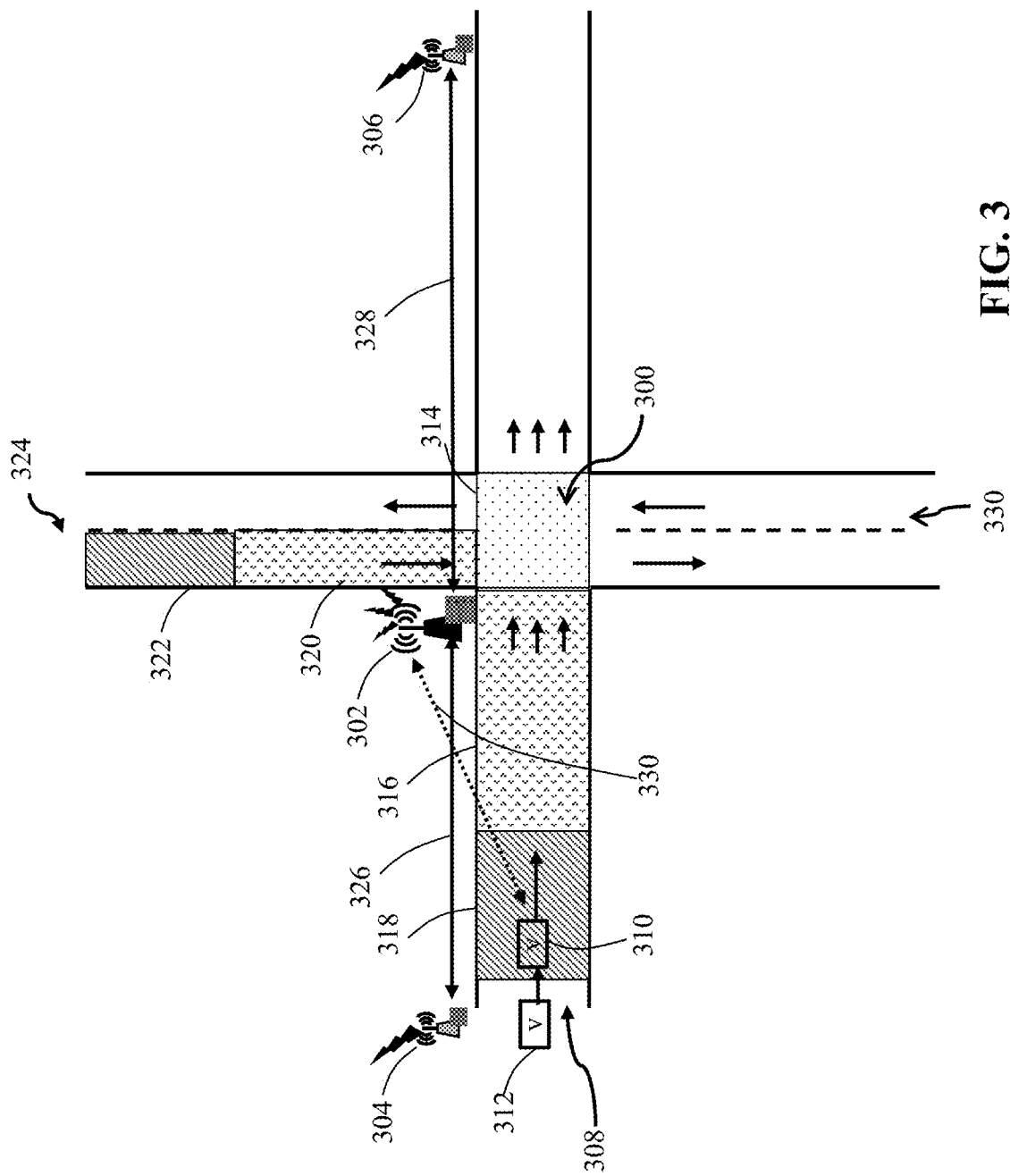
FIG. 3 shows a schematic diagram illustrating zone partition in proximity to a road intersection, according to some embodiments.

FIG. 3 shows a schematic diagram illustrating zone partition in proximity to a road intersection, according to some embodiments. In FIG. 3, an IoV-Edge 302 is located at an intersection 300, where the intersection 300 may be interconnected to other intersections (not shown in FIG. 3). Each intersection may be associated with an IoV-Edge.

For instance, interconnected intersections in an urban road environment are installed with IoV-Edges, as shown in FIG. 3. In such an environment, neighboring intersections are connected to a central IoV-Edge. As shown in FIG. 3, the IoV-Edge 302 is the central IoV-Edge to other IoV-Edges (such as IoV-Edge 304 and IoV-Edge 306). The IoV-Edge 304 and the IoV-Edge 306 are connected to the IoV-Edge 302 through wired or wireless communication networks. Each of the IoV-Edge 302, the IoV-Edge 304, and the IoV-Edge 306 corresponds to the RSU 122 or RSU 124 as shown in FIG. 1. Further, the traffic of each neighboring intersection is controlled by corresponding neighboring IoV-Edge independently.

The IoV-Edge 302 generates road data that includes parts of a road 308 approaching the intersection 300 into sections (such as a sequencing zone 318 and a control zone 316) to provide safe and optimal control of vehicular traffic. The road 308 is a one-direction road intersected by a north bound road (i.e. a road 324) and a south bound road (i.e. a road 330), where an intersection area of the road 308 is an intersection or a crossing zone 314. In a similar manner, for a two-lane road 324, the lane that approaches towards the IoV-Edge 302 is partitioned into a sequencing zone 322 and a control zone 320 by the corresponding IoV-Edge 302.

Further, the IoV-Edge 302 computes an intersection crossing velocity for a vehicle 310 for entering the sequencing zone 318 in order to exit the intersection 300. In the sequencing zone 318, the IoV-Edge 302 computes an intersection crossing time (i.e., optimal time) for the vehicle 310 to cross the intersection 300 with minimum delay. The IoV-Edge 302 communicates with the neighboring IoV-Edge 304 and vehicles, such as the vehicle 310 that provides the traffic data. The IoV-Edge 302 and the IoV-Edge 304 communicate via communication link 326, which can be wired or wireless. The IoV-Edge 304 informs the IoV-Edge 302 about arrival of the vehicle 310. The vehicle 310 establishes connection with the IoV-Edge 302 when it enters sequence Zone 318 via wireless communication link 330. The IoV-Edge 302 then collects state of the vehicle 310 such as vehicle identifier (ID), location, speed, acceleration, etc. In the control zone 316, location and velocity of the vehicle 310 is controlled to arrive at the crossing zone 314 based on the intersection crossing time with an intersection crossing velocity.

Further, the IoV-Edge 302 transmits the intersection crossing time and velocity to the vehicle 310 via wireless communication link 330. The vehicle 310 determines the optimal motion trajectory to be applied in control zone 316 based on the intersection crossing time and velocity. The optimal motion trajectory is transmitted to neighboring vehicle, such as a vehicle 312, and IoV-Edge 302. The vehicle 312 determines corresponding motion trajectory based on the optimal motion trajectory of the vehicle 310. In an alternate embodiment, the IoV-Edge 302 determines motion trajectory in the control zone 316 for the vehicle 310 based on at least one of the optimal arrival time, vehicle location, vehicle speed, vehicle acceleration, speed limit, acceleration limit, headway constraint, or road map. The motion trajectory is determined as a vehicle location, a vehicle velocity, and a value of vehicle acceleration at different time instants, e.g., time to enter the control zone 316, time to enter the crossing zone 314, and time to exit the crossing zone 314. Further, the IoV-Edge 302 controls vehicle mobility based on the determined motion trajectory.

The intersection crossing time and velocity at which the vehicle 310 crosses the intersection 300 prevent the vehicle 310 to stop while crossing the intersection 300, and thus improve driving comfort and minimizing fuel consumption. This also allows the vehicle 310 to safely cross the crossing zone 314 without collision. When the vehicle 310 exits the crossing zone 314, the IoV-Edge 302 provides information of next intersection to the vehicle 310. The IoV-Edge 302 also transmits information of the vehicle 310 to the IoV-Edge 306 via communication link 328 (wired or wireless). The information provides details on arrival of the vehicle 310 to the IoV-Edge 306. The IoV-Edges 302 and 306 also communicate with the vehicle 310 via the wireless communication link 330. This allows the vehicle 310 to provide the information to the IoV-Edges 302 and 306. Examples of the communication link 330 include a DSRC link, a C-V2X link, and the like. Accordingly, the center IoV-Edge 302 communicates with both vehicles (e.g. the vehicle 310) and neighboring IoV-Edges (e.g. the IoV-Edges 304 and 306) to make optimal control decision.

Further, to provide the control decision in an efficient manner, the IoV-Edge 302 determines start point of each zone (i.e., the control zone 316 and the sequencing zone 318). The IoV-Edge 302 determines length of each zone, which is described further with reference to FIG. 4.

Figure 4:
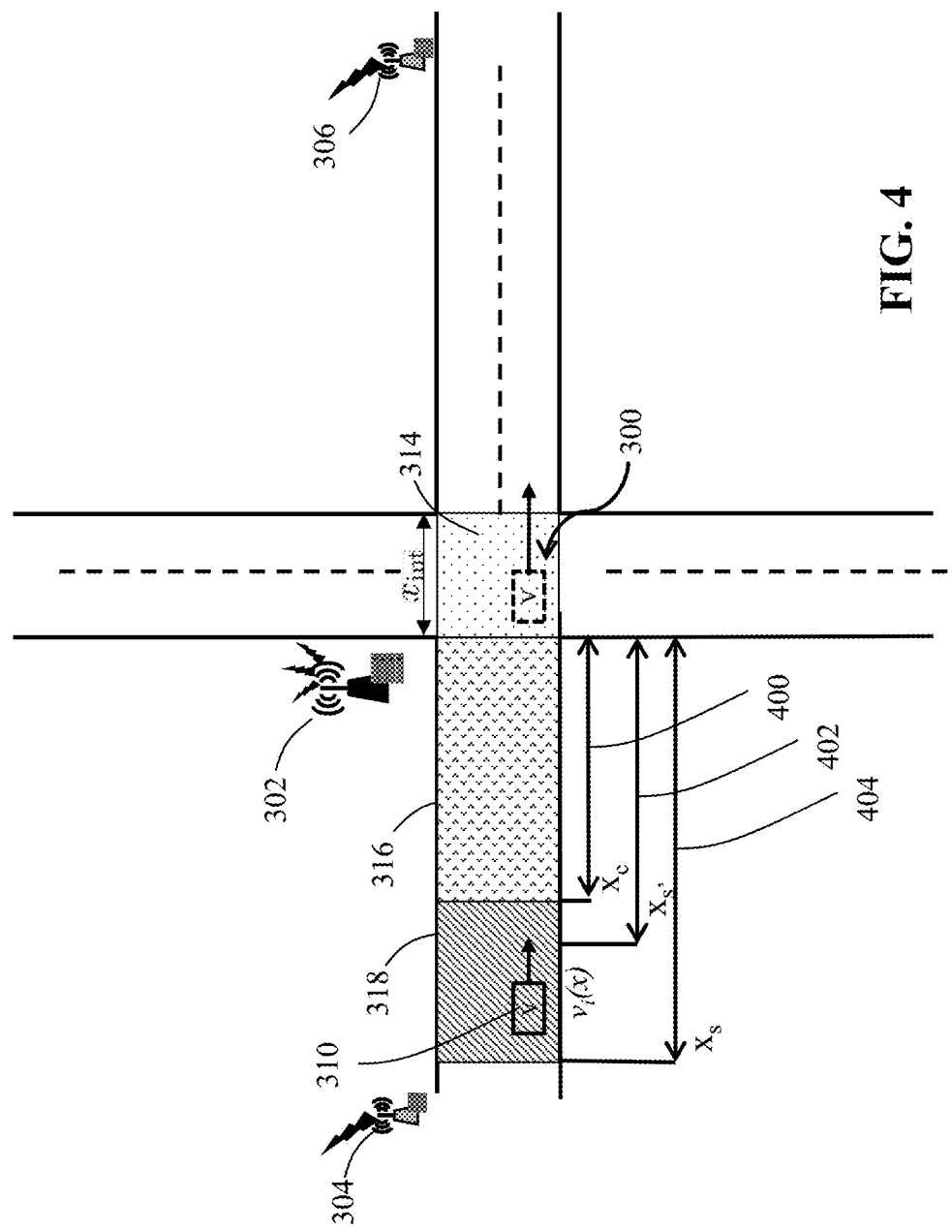
FIG. 4 shows a schematic diagram illustrating a length of a sequencing zone and a length of a control zone of the road intersection, according to some embodiments.

FIG. 4 shows a schematic diagram illustrating a length of the sequencing zone 318 and a length of the control zone 316 of the road intersection 300, according to some embodiments.

In an illustrative example scenario, when the vehicle 310 with ID i enters the sequencing zone 318 at distance $x_s$ from start point of the sequence zone 318 to the crossing zone 314, the vehicle 310 transmits a heartbeat message to the IoV-Edge 302. The heartbeat message contains state of a vehicle (i.e. the vehicle 310), which further is described in FIG. 5. Upon receiving the heartbeat message from vehicle 310, the IoV-Edge 302 transmits an announcement message to the vehicle 310. The announcement message provides information about starting point of the control zone 316 and the crossing zone 314 as well as length of the crossing zone 314, $x_{int}$. The distance $x_s$ 404 is used to the length of sequence zone 318, which is a function of a computational speed of the IoV-Edge 302. The vehicle 310 then reaches a location x in the sequencing zone 318 at velocity, $v_i(x)$. The IoV-Edge 302 computes velocity for the vehicle 310 to enter the intersection 300, i.e. $v_{int,i}$ and time $t_{out,i}$ for the vehicle 310 to exit the crossing zone 314 of size $x_{int}$. When the vehicle 310 is at location $x_{s'}$, the IoV-Edge 302 transmits a scheduling message to the vehicle 310. The scheduling message includes the $v_{int,i}$ and time $t_{ont,i}$, which is described further in FIG. 6. When vehicle 310 travels from location $x_{s'}$ to location $x_c$, it determines optimal motion trajectory to be applied in control zone 316.

The two messages (i.e. the announcement message and the scheduling message) have data sizes, $K_{x_s}$ and $K_{x_{s'}}$ bits, respectively. These messages are transmitted to the vehicle 310 before the vehicle 310 enters the control zone 316 of length $x_c$. For a message of size K bits, wireless transmission time is given by:

$$D_i(x) = \frac{K}{R_i(x)} \tag{1}$$

where, $R_i(x)$ is data rate of a downlink between the IoV-Edge 302 and the vehicle 310 and defined as $$R_i(x) = B\log_2\left(1 + \frac{g_i(x)P_{tx}}{BN_0}\right) \tag{2}$$

where
$g_i(x)=\beta_1 x^{-\beta_2}$ is channel gain between the vehicle 310 and the IoV-Edge 302 with x being the distance between the vehicle 310 and the IoV-Edge 302,
$\beta_1$ is path loss constant and $\beta_2$ is path loss exponent,
$P_{tx}$ is transmission power of the IoV-Edge 302,
B is bandwidth of the channel, and
$N_0$ is noise power spectral density.

The IoV-Edge 302 takes computation time $t_s$ at the sequencing zone 318 for the edge computing. The transmission time of the announcement message and the computation time $t_s$ satisfies $$D_i(x_s) + t_s \leq \int_{-x_s}^{-x_{s'}} \frac{1}{v_i(x)} dx \tag{3}$$

In other words, the sum of the transmission time of the announcement message and the computation time $t_s$ needs to be less than vehicle travel time from location $x_s$ to location $x_{s'}$.

When the vehicle 310 receives the scheduling message from the IoV-Edge 302, the vehicle 310 determines an optimal motion trajectory to be applied in the control zone 316. The vehicle 310 takes a computation time of $t_c$ for computing the optimal motion trajectory. The transmission time of the scheduling message and the computation time $t_c$ satisfies $$D_i(x_{s'}) + t_c \leq \int_{-x_{s'}}^{-x_c} \frac{1}{v_i(x)} dx \tag{4}$$

When the vehicle 310 enters the control zone 316, velocity of the vehicle 310 is controlled to arrive at the crossing zone 314 with the intersection crossing time and velocity determined by the IoV-Edge 302. The vehicles (e.g. the vehicles 310 and 312) adjust their velocities according to their dynamics model.

Thus, it is essential to determine values of the distance variables $x_s$ 404, $x_{s'}$ 402 and $x_c$ 400 such that the constraints in (3) and (4) are satisfied.

To that end, the control zone size must be long enough such that vehicle i 310 can reach any velocity from its control zone entering velocity $v_i(x_c)$. Therefore, the minimum control zone length for vehicle i can be determined as $$x_c \geq \max\left(\frac{v_{max}^2 - v_i^2(x_c)}{2a_{max}}, \frac{-v_i^2(x_c)}{2a_{min}}\right).$$

The first term $$\frac{v_{max}^2 - v_i^2(x_c)}{2a_{max}}$$

is the distance required to accelerate the vehicle 310 to the maximum velocity from the velocity $v_i(x_c)$ using the maximum acceleration $a_{max}$ while the second term $$\frac{-v_i^2(x_c)}{2a_{min}}$$

is the distance needed to stop the vehicle 310 from the velocity $v_i(x_c)$ using the maximum deceleration $a_{min}$. This result provides a lower bound for the control zone length for vehicle 310. For all vehicle, the IoV-Edge 302 can determine $x_c$ such that $$x_c \geq \max\left(\frac{v_{max}^2}{2a_{max}}, \frac{-v_i^2(x_c)}{2a_{min}}\right) \quad (5)$$

Once control zone length $x_c$ is decided, $x_s$ and $x_{s'}$ are determined such that $x_{s'}-x_c$ is long enough for (4) to be true. In fact, if (4) is true for vehicles traveling with the maximum velocity, then (4) is true for all vehicles. For the maximum velocity vehicle, (4) becomes $$D_i(x_{s'}) + t_c \leq \frac{x_{s'} - x_c}{v_{max}}.$$

Therefore, $x_{s'}$ is given by $$x_{s'} = x_c + v_{max}(D_i(x_{s'}) + t_c) \quad (6)$$

Once $x_{s'}$ is determined, $x_s$ needs to be chosen such that $x_s-x_{s'}$ long enough for (3) to be true. Similarly, if (3) is true for vehicle traveling with the maximum velocity, then it is true for all vehicles. For the maximum velocity vehicle, (3) becomes $$D_i(x_s) + t_s \leq \frac{x_s - x_{s'}}{v_{max}}.$$

Therefore, $x_s$ is given by $$x_s = x_{s'} + v_{max}(D_i(x_s) + t_s) \quad (7)$$

Finally, the sequence zone length must be greater than or equal to $x_s-x_c$.

Each vehicle (e.g., the vehicle 310) optimizes the motion trajectory that reaches the crossing zone 314 at the intersection crossing time with the intersection crossing velocity. The vehicle 310 determines an acceleration $a_i$ and velocity $v_i$ for the control zone 316. The acceleration is minimized and the vehicle 310 is controlled to arrive at the crossing zone 314 with the determined intersection crossing velocity. In the trajectory optimization problem, discrete time system is applied with $T_s$ as the sampling period. The vehicle 310 can optimize the velocity $v=[v_i(t_0), v_i(t_n), \ldots, v_i(t_N)]$ and acceleration $a=[a_i(t_0), \ldots a_i(t_n), \ldots, a_i(t_{N-1})]$, where $t_n=nT_s$, $\forall n \in [0, N]$. In other words, the vehicle determines the optimal velocity and the corresponding acceleration by solving following quadratic programming (QP) problem:

$$\min_{v_i,a_i} \sum_{n=0}^{N-1} ((v_i(t_n) - v_{int,i})^2 + qa_i(n)^2) \quad (8)$$

subject to $$0 \leq x_i(t_n) \leq x_{i-1}(t_n) - d_h, \forall i, i-1 \in I_d, \forall n \in [1,N] \quad (9)$$

$$v_{min} \leq v_i(t_n) \leq v_{max}, \forall i \in I \quad (10)$$

$$a_{min} \leq a_i(t_n) \leq a_{max}, \forall i \in I \quad (11)$$

$$x_i(t_0) = x_c, x_i(t_N) = 0, \forall i \in I \quad (12)$$

$$v_i(t_0) = v_{0,i}, v_i(t_N) = v_{int,i}, \forall i \in I \quad (13)$$

$$v_i(t_n) = v_i(t_{n-1}) + a_i(t_n)T_s, \forall n \in [1,N] \quad (14)$$

where q is a constant to weight in acceleration, $x_{i-1}(t_n)$ is the location of the preceding vehicle i−1 at time $t_n$ obtained from status update message transmitted by vehicle i−1, $d_h$ is the headway safety driving distance to avoid a forward collision, $v_{0,i}$ is the velocity for vehicle i to enter the control zone, vehicle i computes motion trajectory when it close to the control zone, therefore, vehicle i can either predict its velocity to enter control zone or control its velocity to enter control, the reference velocity $v_{int,i}$ can be any velocity satisfying traffic policy and traffic condition. By minimizing the first term of the objective function in (8), the vehicle i will adjust its velocity as close as possible to the reference velocity $v_{int,i}$. By minimizing the second term of the objective function in (8), the vehicle i can reduce the usage of acceleration and smooth mobility. Therefore, the driving comfort can be improved and the fuel consumption can be reduced.

The condition (9) is safe headway distance constraint, condition (10) shows speed constraint such that vehicle i must follow traffic rule, condition (11) is acceleration constraint for driving comfort and fuel reduction, condition (12) is the location constraint such that motion trajectory starts from vehicle i enters control zone until to vehicle i enter the crossing zone, condition (13) is the velocity constraint such that vehicle i enters control zone with velocity $v_{0,i}$ and enters crossing zone with reference velocity $v_{int,i}$, and condition (14) is the velocity and acceleration relationship constraint indicating velocity and acceleration are related.

Once the velocity is determined, the location of vehicle i can be calculated by using vehicle dynamics equation as $$x_i(t_{n+1}) = x_i(t_n) + \frac{v_i(t_n) + v_i(t_{n+1})}{2} T_s, \quad (15)$$

$$\forall n \in [1, N-1], \forall i \in I$$

The QP problem (8)-(14) and dynamics equation (15) give motion trajectory of vehicle 310 as $(x_i(t_n), v_i(t_n), a_i(t_n)) \forall n \in [0, N]$.

Figure 5:
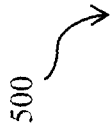
FIG. 5 shows an exemplary representation of information of states of vehicles approaching an intersection of interconnected intersections and directions of vehicles exiting the intersection, according to some embodiments.

FIG. 5 shows an exemplary representation 500 of information of states of vehicles approaching an intersection and directions of the vehicles, according to some embodiments.

In some embodiments, an IoV-Edge such as the IoV-Edge 302 (shown in FIG. 3) receives information of the vehicle state to control traffic at interconnected intersections (such as the intersection 300), when the vehicle 310 enters a sequencing zone (e.g. the sequencing zone 318). The information of the vehicle state is received through the heartbeat message, where the information of the vehicle state includes vehicle information 502, a location data 504, a longitudinal position data 506, a velocity data 508, an acceleration data 510, direction information 512 and intersection intention 513. The vehicle information 502 includes a vehicle identifier (ID). The location data 504 includes current location of the vehicle 310. The longitudinal position data 506 includes longitudinal position of the vehicle 310. The velocity and acceleration of the vehicle 310 are provided by the velocity data 508 and acceleration data 510, respectively. The longitudinal position 506 and the velocity data 508 are used in longitudinal dynamics for controlling to vehicle 310. The intersection intention 513 indicates how vehicle 310 plans to cross the intersection, e.g., going straight. The direction information 512 corresponds to incoming traffic direction d that can be one four directions, i.e., $d \in \{n, e, w, s\}$ referring north, east, west and south. The set of vehicles that approach an intersection from north, east, west and south directions are denoted by $I_n$, $I_e$, $I_w$ and $I_s$, respectively. Each vehicle is indexed by $i \in I = I_n \cup I_e \cup I_w \cup I_s$. Referring back to FIG. 3, for instance, if the vehicle 310 moves from south to north, the moving direction of the vehicle 310 is denoted by $d(i)=s$. The IoV-Edge 302 uses the information of the vehicle state and direction information for computing the intersection crossing time and velocity for the vehicle 310.

Figure 6:
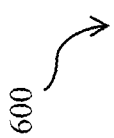
FIG. 6 shows an exemplary representation of intersection crossing times and velocities for the vehicles exiting the intersection, according to some embodiments.

Further, the intersection crossing time and velocity is transmitted to the vehicle 310, which is shown next in FIG. 6.

FIG. 6 shows an exemplary representation 600 of an intersection crossing time and velocity for the vehicle 310 exiting the intersection, according to one embodiment.

The intersection crossing time and velocity is transmitted through the scheduling message that includes the vehicle information 502, intersection size 602, traffic direction 604, intersection start location 606, intersection exiting time 608, intersection crossing time 610, and intersection crossing velocity 612. The intersection size 602 corresponds to a size of the crossing zone 314, $x_{int}$ as described in FIG. 4. The traffic direction 604 includes traffic information in the direction of the vehicle 310. The intersection start location 606 is the location where the intersection starts. The intersection exit time 608 is the time to exit the intersection. The intersection crossing time 610 is the time for vehicle to cross the intersection and intersection crossing velocity 612 is the recommended velocity that corresponds to a speed limit rule for safety requirement, traffic regulations and traffic conditions. The scheduling message also includes information about preceding vehicle.

Referring back to FIG. 3, each IoV-Edge (e.g. the IoV-Edge 302) communicates with each vehicle (e.g. the vehicle 310 and the vehicle 312) in the zones 316 and 318 and neighboring IoV-Edges 304 and 306 using a zone-based communication protocol. The zone-based communication protocol supports transmitting information of the sequencing zone to the vehicle, transmitting a state of the vehicle arriving at the sequencing zone, and transmitting an intersection crossing time and a velocity for exiting the intersection, via the announcement message, the heartbeat message and the scheduling message, respectively. The zone-based communication protocol also supports transmitting information about preceding vehicle to the vehicle, transmitting the vehicle motion trajectory to next vehicle and the IoV-Edge 302, transmitting traffic data of the intersection to the next intersection, and transmitting zone information of the next intersection to the vehicle. The IoV-Edges also exchanges information with the vehicles, which is further described in FIG. 7.

Figure 7:
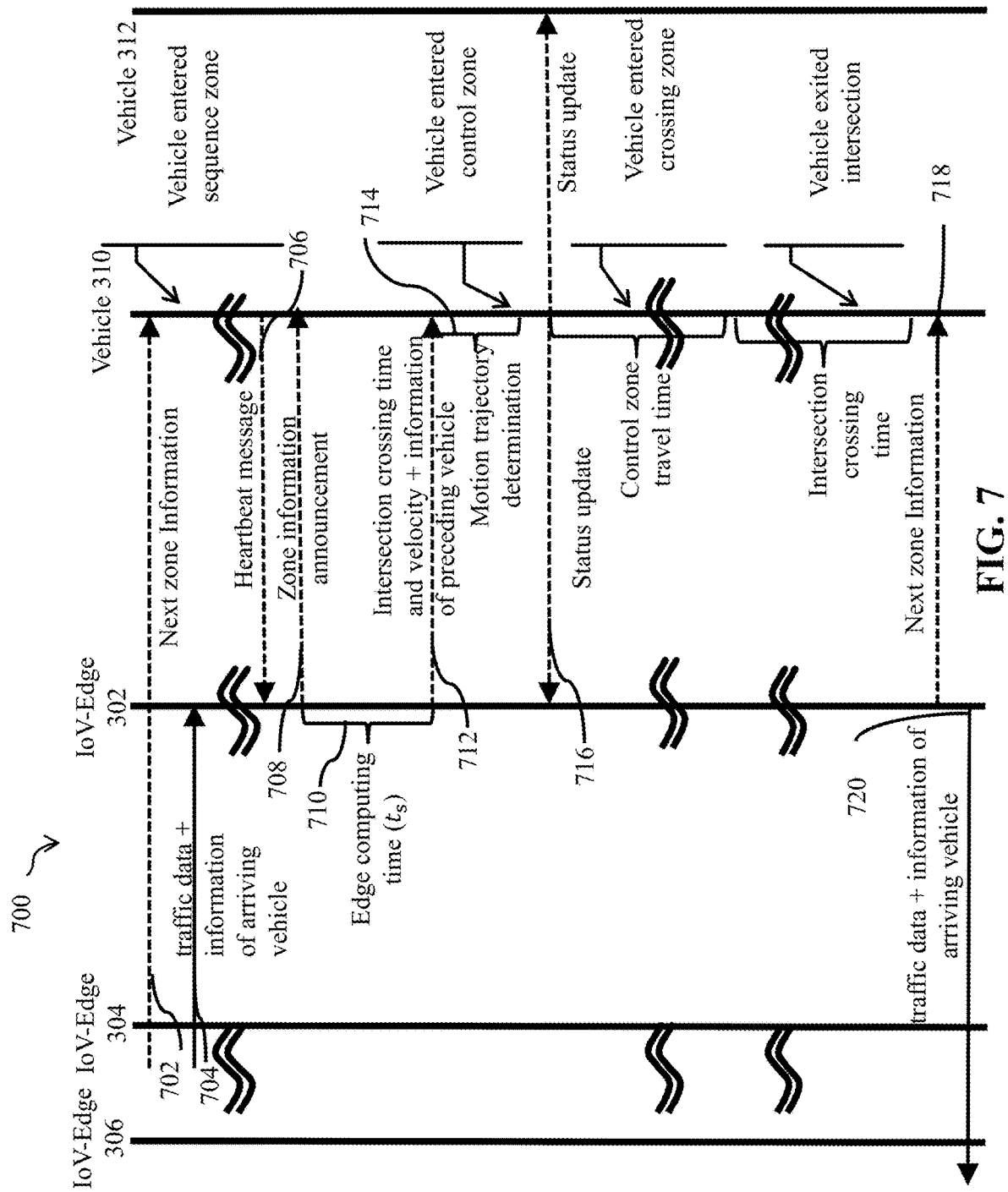
FIG. 7 shows an exemplary representation of information exchange among IoV-Edges and the vehicles crossing the intersection, according to some embodiments.

FIG. 7 shows an exemplary representation 700 of information exchange among the IoV-Edges and the vehicles crossing the intersection, according to some embodiments. The IoV-Edges include the IoV-Edge 302, the IoV-Edge 304, and the IoV-Edge 306 as described in FIG. 3. The vehicles include the vehicle 310 and the vehicle 312, which are described in FIG. 3 and FIG. 4. In an illustrative example scenario, the vehicle 310 starts approaching towards the intersection 300. At step 702, the IoV-Edge 304 transmits next zone information to the vehicle 310. The next zone information includes starting location of sequencing zone of the intersection 300 determined by the IoV-Edge 302. At 704, the IoV-Edge 304 sends traffic data and information about arrival of the vehicle 310 to the IoV-Edge 302. When the vehicle 310 enters the sequencing zone 318, the vehicle 310 sends a heartbeat message to the IoV-Edge 302 at step 706. The heartbeat message includes information of status of the vehicle 310, such as ID, location, velocity and acceleration of the vehicle 310 (as described in FIG. 5). At step 708, the IoV-Edge 302 sends an announcement message to the vehicle 310 upon receiving the heartbeat message. The announcement message includes information of start location of the control zone 316 and start location of the crossing zone 314 as well as a length of the crossing zone 314.

At step 710, the IoV-Edge 302 performs edge computation to determine intersection crossing time and velocity for the vehicle 310 for crossing the intersection 300. At step 712, the IoV-Edge 302 transmits information of the intersection crossing time and velocity along with information of preceding vehicles to the vehicle 310 via a scheduling message. The scheduling message is transmitted before the vehicle 310 enters the control zone 316.

At step 714, the vehicle 310 determines an optimal motion trajectory to be applied in the control zone 316 such that the vehicle 310 exits the intersection 300 at the intersection crossing time and velocity. The vehicle 310 enters the control zone 316 based on the optimal motion trajectory. At step 716, the vehicle 310 transmits a status update message containing the optimal motion trajectory to the IoV-Edge 302. The IoV-Edge 302 further transmits to the status update message to neighboring vehicles of the vehicle 310, such as the vehicle 312 for trajectory planning. The status update message for the vehicle 312 is included in a scheduling message to be sent to the vehicle 312 by the IoV-Edge 302, when the vehicle 312 is about to enter the control zone 316. The IoV-Edge 302 can also use the status update message to compute a global trajectory for the vehicle 310. In this manner, vehicle collision is avoided. Alternatively, or additionally, the vehicle 310 may transmit the status update message to the vehicle 312 for the trajectory planning. The vehicle 310 exits the crossing zone 314 based on the intersection crossing time and velocity.

At step 718, the IoV-Edge 302 transmits next zone information of next intersection to the vehicle 310. At step 720, the IoV-Edge 302 transmits traffic data and information of the vehicle 310 approaching the next intersection to the IoV-Edge 306. The traffic data is also transmitted to the IoV-Edge 304. In this manner, vehicle mobility is controlled and coordinated to enable controlling of vehicles (e.g. the vehicles 310 and 312) to pass the interconnected intersections for traffic improvement.

In some embodiments, the IoV-Edges (e.g. the IoV-Edges 302) performs tuning of crossing the intersection based on directional weights of the vehicles that reflect interfering traffic at neighboring intersections. The objective of the tuning procedure is to minimize the weighted (total or maximum) travel time. Thus, the weight is dynamically adaptable, which enable the traffic control to adapt to emergency or abrupt scenarios. The determination of the weight for the minimization procedure is described further in FIG. 8.

Figure 8:
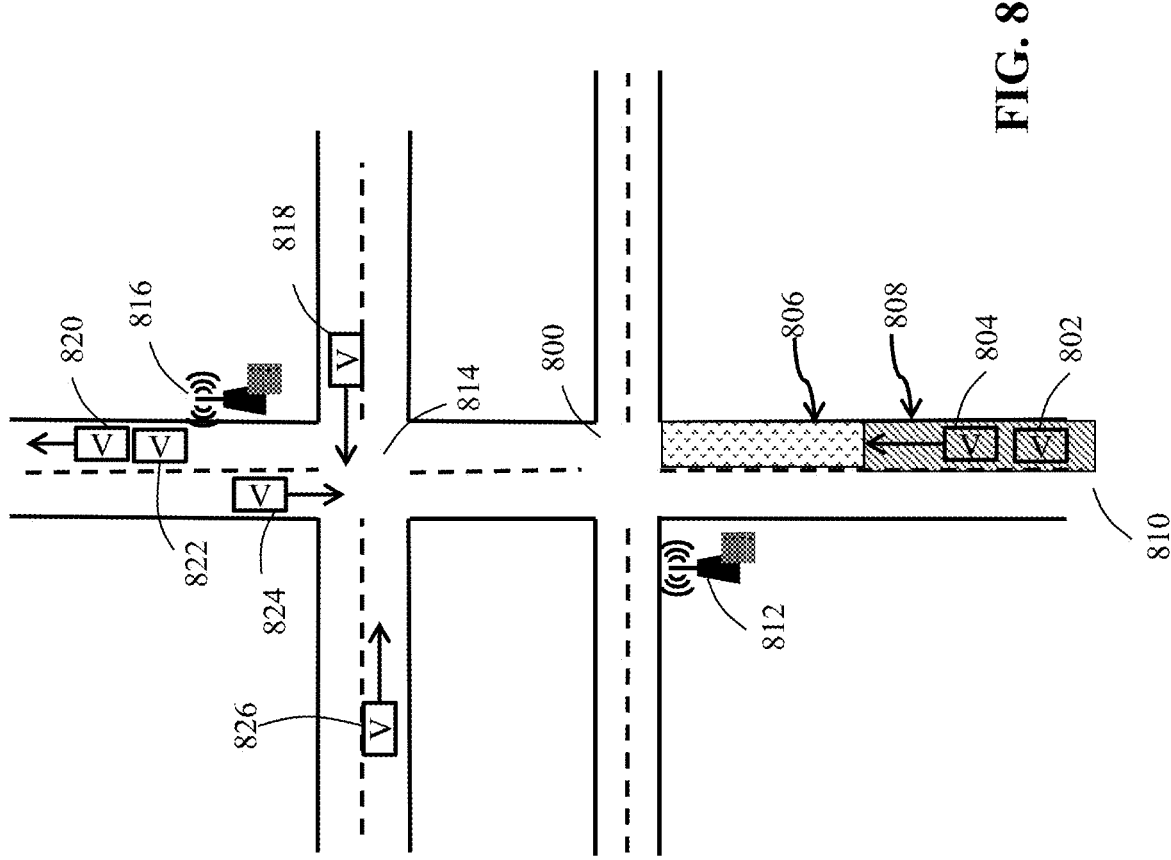
FIG. 8 shows an exemplary schematic diagram depicting determination of weights of vehicles based on directions of the vehicles for minimization of at least one of a total travel time or maximum travel time of the vehicles, according to some embodiments.

FIG. 8 shows an exemplary schematic diagram depicting determination of weights of vehicles based on directions of the vehicles for minimization of at least one of a total travel time or maximum travel time of the vehicles, according to some embodiments. In FIG. 8, an IoV-Edge 812 partitions a road 810 connecting to an intersection 800, where the road 810 is partitioned into a control zone 806 and a sequencing zone 808. In the sequencing zone 808 a vehicle 802 and a vehicle 804 are approaching towards the intersection 800. The IoV-Edge 812 corresponds to the IoV-Edge 302, the vehicle 802 corresponds to the vehicle 310, and the vehicle 804 corresponds to and the vehicle 312 as described in FIG. 3 and FIG. 4. For each vehicle (i.e. the vehicle 802 and 804), a weight is determined by the IoV-Edge 812. The weight of each of the vehicle 802 and the vehicle 804 is based on the traffic at next intersection, such as intersection 814 towards a direction of the vehicle 802 (or the vehicle 804) exiting the intersection 800.

In an illustrative example scenario, there is traffic congestion due to a set of vehicles 818-826 at the intersection 814, as shown in FIG. 8. Accordingly, in some embodiments, a weight of the vehicle 802 crossing the intersection 800 is determined based on traffic at the intersection 814. The traffic at the next intersection 814 is formed by motion of vehicles intersecting the direction of the vehicle 802. Neighboring IoV-Edges (such as an IoV-Edge 816) share traffic information with the IoV-Edge 812. The traffic information includes number of vehicles and traveling directions of the vehicles at the neighboring intersection 814.

The IoV-Edge 812 determines a weighted travel time for the vehicle 802 with ID i approaching the intersection 800 in direction d(i) for estimating the intersection crossing time and velocity for the vehicle 802. The directional weight for travel time of the vehicle 802 is determined based on $$w_{d(i)} = \frac{N - N_{d(i)^\perp}}{N} W_i \in [0, 1], \forall i \in I \quad (16)$$

where $d(i)^\perp$ is the orthogonal direction with respect to direction d(i),
N is total number of vehicles on all lanes at the next intersection, $N_{d(i)^\perp}$ is number of vehicles on the lanes in $N_{d(i)^\perp}$ directions at the next intersection, and $W_W$ is a physical weight coefficient to reflect vehicle features.

The $w_{d(i)}$ decreases if more vehicles are traveling in $d(i)^\perp$ directions at neighboring intersection. The IoV-Edge 812 tends to delay the exiting time of vehicle having a small $w_{d(i)}$. If the vehicle traveling in $d_i$ direction have a small $w_{d(i)}$, more vehicles travel in $N_{d(i)^\perp}$ direction at next intersection. Therefore, the vehicle is delayed to arrive at the next intersection so that the neighboring intersection can serve other vehicles in $N_{d(i)^\perp}$ directions with a priority. By doing so, the traffic flow of the interconnected intersections can be improved.

Using directional weight $w_{d(i)}$ for vehicle 812, the travel time is weighted. For example, for vehicle i, if the sequence zone entering time $t_{s,i}$ and the intersection exit time is $t_{out,i}$, the weighted travel time is $w_{d(i)}(t_{out,i}-t_{s,i})$.

In a similar manner, weight of the vehicle 820 is also determined. The total travel time or the maximum travel time of the vehicles is weighted based on the determined weight $w_{d(i)}$. The weighted travel time is minimized by solving a mixed integer linear problem (MILP). The IoV-Edge 812 solves the MILP as follows:

$$\min_{t_{out},B} \sum_{\forall i \in I} (w_{d(i)}(t_{out,i} - t_{s,i})) \quad (17)$$

subject to $$t_{out,i} - t_{s,i} \geq t_{m,i}, \forall i \in I \quad (18)$$

$$t_{out,i+1} - t_{out,i} \geq t_h, \forall i \in I_d \quad (19)$$

$$t_{out,i} - t_{out,i'} + MB_{i,i'} \geq t_{int,i}, \forall i,i' \in I, i \neq i' \quad (20)$$

$$t_{out,i'} - t_{out,i} + M(1-B_{i,i'}) \geq t_{int,i}, \forall i,i' \in I, i \neq i' \quad (21)$$

where I is set of vehicles, $t_{out}$ is the vector consisting of $t_{out,i}$, $\forall i \in I$, $I_d$ is set of vehicles traveling in direction d on same lane, $B_{i,i'} \in \{0, 1\}$, B is the vector of $B_{i,i'}$, $\forall i, i' \in I, i \neq i'$. $B_{i,i'}=0$ implies that vehicle i is scheduled to cross intersection prior to vehicle i' and $B_{i,i'}=i$ implies that vehicle i is scheduled to cross intersection after vehicle i'. The constraint (18) shows that vehicle i must not violate the speed limit rule from entering the sequence zone to exiting the intersection, i.e., its travel time has a lower bound $t_{m,i}$. For example, $(x_s+x_{int})/v_{max}$ is a travel time lower bound. In the constraint (19), headway time $t_h$ is applied to guarantee the safety time gap between two adjacent vehicles on the same lane. The constraints (20) and (21) guarantee that only one vehicle can pass the intersection at a time. In particular, the difference of exit time of any two vehicles i and i' needs to be greater than the travel time in the intersection of the preceding vehicle. In (20) and (21), M is an arbitrarily large constant used in a big-M method.

For the weighted maximum travel time objective function, the MILP problem is formulated as $$\min_{t_{out},B} \max_{\forall i \in I} (w_{d(i)}(t_{out,i} - t_{s,i})) \quad (22)$$

The physical weight coefficient Wi of the vehicle can be dynamically adapted. Further, weight coefficient of one vehicle differs from weight coefficient of another vehicle. For example, the vehicle 802 is a motor bike and the vehicle 820 is a truck. The weight coefficient of the truck will differ from the weight coefficient of the motor bike. The IoV-Edge 812 can assign weight coefficient of the truck such that the truck has a small directional weight $w_{d_{(i)}}$ than that of the motor bike. In such case, the IoV-Edge 812 delays exit time of truck having the small directional weight. The motor bike that has higher directional weight is prioritized to take over the truck for crossing the intersection 800. In case the destination of the truck arrives shortly after crossing the intersection 800, the weight coefficient is balanced based on the destination. The information of balanced weight coefficient is used to determine intersection crossing time and the velocity of the truck to cross the intersection 800. The truck plans motion trajectory to cross the intersection 800 based on the intersection crossing time and the velocity. The planned motion trajectory is updated to the motor bike.

In case of emergency such as an ambulance is crossing the intersection 814 in $d(i)^{-1}$ direction, the IoV-Edge 816 informs the emergency situation to the IoV-Edge 812. The IoV-Edge 812 performs the weight adjustment based on the emergency traffic, such that the directional weights of the vehicles 802 and 804 traveling in direction d(i) having a small weight $w_{d_{(i)}}$. The vehicles 802 and 804 are delayed to arrive at the next intersection 814 so that the neighboring intersection 814 can serve ambulance with a priority. This improves traffic flow of the interconnected intersections. When the neighboring intersection 814 is congested with interfering vehicles, i.e. the vehicles with small $w_{d_{(i)}}$, the IoV-Edge 812 instantly decreases the incoming traffic by delaying the vehicles to arrive at the next intersection 814. In case the neighboring intersection 814 has less interfering vehicles, i.e. vehicles with large $w_{d_{(i)}}$, the IoV-Edge 812 schedules the vehicles to arrive at the next intersection 814 without a delay. Thus, the directional weight is dynamic in nature and different vehicles will have different weights.

Figure 9:
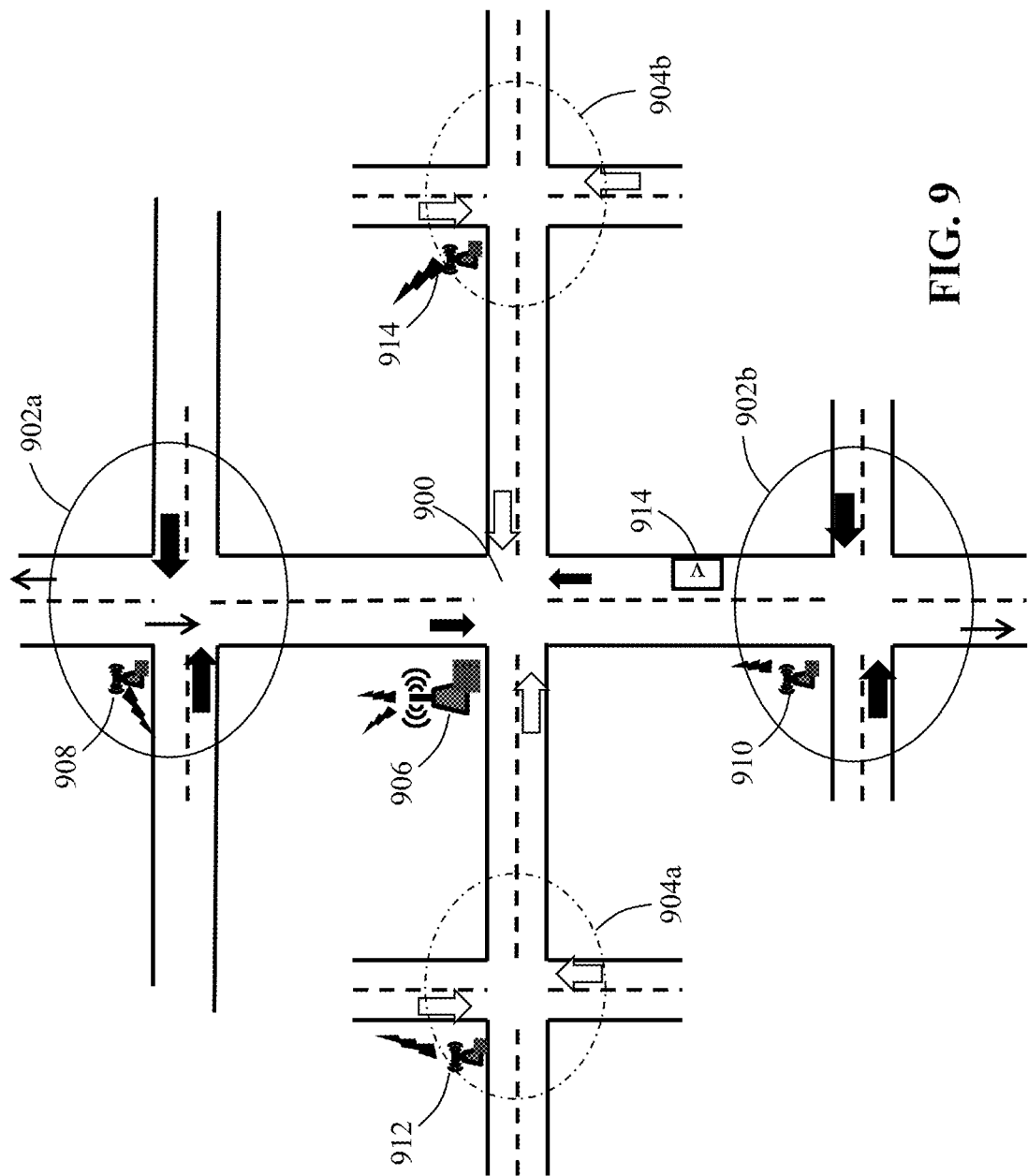
FIG. 9 shows an exemplary schematic diagram of controlling traffic at interconnected intersections of roads based on intersection crossing times and velocities of the vehicles, according to some embodiments.

FIG. 9 shows an exemplary schematic diagram of controlling traffic at interconnected intersections of roads based on intersection crossing times and velocities of the vehicles, according to some embodiments.

As shown in FIG. 9, there are multiple interconnected intersections 900, 902a, 902b, 904a and 904b. Three intersections 904a, 900, and 904b denoted by west, center and east, respectively are interconnected in parallel. Traffic at the intersections 900, 902a, 902b, 904a and 904b is controlled by IoV-Edges 906, 908, 910, 912 and 914 respectively. In an illustrative example scenario, traffic in north-south direction at the intersections 902a and 902b is highly congested than traffic in east-west at the intersections 904a and 904b. An IoV-Edge 906 for the intersection 900 controls delays for vehicles (e.g., the vehicle 914) crossing the intersection 900 and traveling towards south-north direction of the intersection 902a. To provide an efficient control decision, the IoV-Edge 906 controls the vehicle 914 such that the vehicle 914 slowdowns its speed while crossing the intersection 900. The IoV-Edge 906 can minimize directional weight of the vehicle 914 to determine a minimized weighted travel time of the vehicle 914. The IoV-Edge 906 then calculates intersection crossing time and velocity for the vehicle 914 to cross the intersection 900 based on the minimized weighted travel time on the basis of the vehicle 914 estimates an optimal motion trajectory. By doing so, the traffic flow of the interconnected intersections is improved as described in description of FIG. 3.

Figure 10:
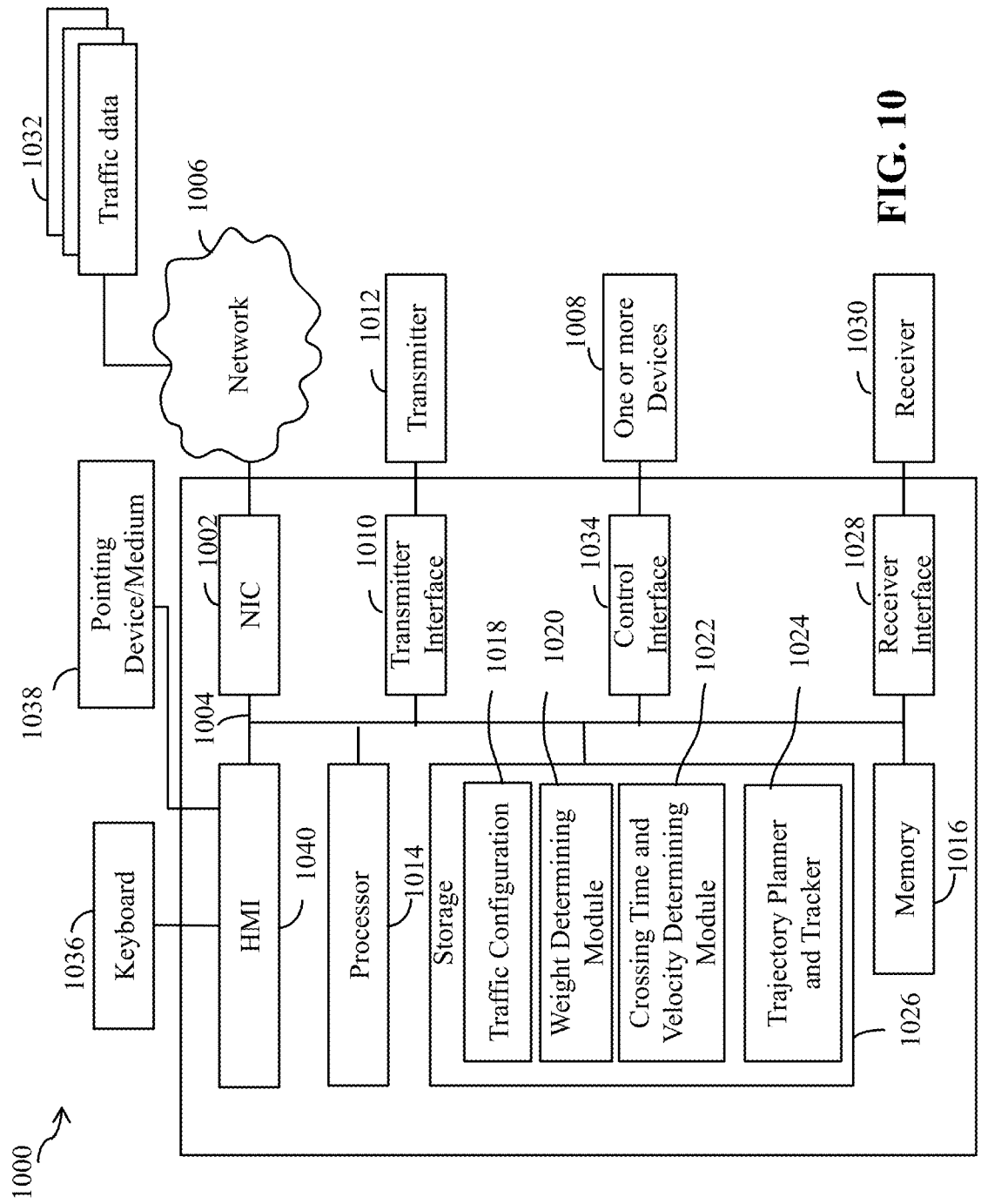
FIG. 10 shows a block diagram of a control system for controlling traffic at interconnected intersections, according to some embodiments.

FIG. 10 shows a block diagram of a control system 1000 for controlling traffic at interconnected intersections, according to some embodiments. The control system 1000 is arranged at an IoV-Edge in proximity to a control point such as merging and/or intersection of roads. Such an arrangement requires an edge device (i.e. the IoV-Edge 302) comprised of a set of sensors or be operatively connected to the set of sensors to collect traffic information in an intersection zone and transmit to vehicles intersection crossing times and velocities before entering a control zone to cross the intersection.

The control system 1000 comprises a number of interfaces connecting the control system 1000 with other systems and devices. For example, the control system 1000 comprises a network interface controller (NIC) 1002 that is adapted to connect the control system 1000 through a bus 1004 to a network 1006 connecting the control system 1000 with one or more devices 1008. Examples of such devices include, but not limited to, vehicles, traffic lights, and traffic sensors. Further, the control system 1000 includes a transmitter interface 1010 configured to command, using a transmitter 1012 and the devices 1008 configured to transmit commands the vehicles to moved based on trajectories that correspond to intersection crossing times and velocities determined by the processor 1014. Through the network 1006, the control system 1000 receives traffic data 1032 using a receiver interface 1028 connected to a receiver 1030, the system 1000 can receive traffic information in the intersection zone as well as traffic information in neighboring intersections. The traffic data includes information of states (e.g., acceleration, location, velocity) of vehicles approaching an intersection of the interconnected intersections and directions of the vehicles exiting the intersection. Additionally, or alternatively, the control system 1000 includes a control interface 1034 configured to transmit commands to the one or more devices 1008 to change their respective state, such as acceleration, velocity, and the like. The control interface 1034 may use the transmitter 1012 to transmit the commands and/or any other communication means.

In some implementations, a human machine interface (HMI) 1040 within the system 1000 connects the control system 1000 to a keyboard 1036 and pointing device 10384, wherein the pointing device 1038 can include a mouse, trackball, touchpad, joy stick, pointing stick, stylus, or touchscreen, among others. The control system 1000 can also be linked through the bus 1004 to a display interface adapted to connect the control system 1000 to a display device, such as a computer monitor, camera, television, projector, or mobile device, among others. The control system 1000 can also be connected to an application interface adapted to connect the control system 1000 to one or more equipment for performing various power distribution tasks.

The control system 1000 includes the processor 1014 configured to execute stored instructions, as well as a memory 1016 that stores instructions that are executable by the processor 1014. The processor 1014 can be a single core processor, a multi-core processor, a computing cluster, or any number of other configurations. The memory 1016 can include random access memory (RAM), read only memory (ROM), flash memory, or any other suitable memory systems. The processor 1014 is connected through the bus 1004 to one or more input and output devices. These instructions implement a method for adaptive control of vehicular traffic at interconnected intersections.

To that end, the system 1000 includes a traffic configuration 1018. For example, the traffic configuration 1018 includes a structure of a zone of intersection of a road. In some embodiments, the structure of the intersection zone includes a sequencing zone and a control zone. Each zone includes information of sections of multiple roads on which the vehicles are moving towards the intersection. In such a manner, the traffic configuration 1018 allows the control system 1000 to control vehicles (e.g., the vehicles 310, 312, 802, 804 and 914) in different zones (e.g., the zones 316, 318, 329, 322, 806 and 808).

The control system 1000 includes a weight determining module 1020 configured to determine weights for travel times of vehicles approaching the intersection, while traveling within a sequencing zone of the intersection, as described in FIG. 8. The weight determining module 1020 is further configured to minimize the weighted travel times of the vehicles. In one example embodiment, the weight determining module 1020 solves a MILP for the minimization procedure. After the minimization, the minimized weighted travel time is provided to crossing time and velocity determining module 1022. The crossing time and velocity determining module 1022 determines intersection crossing times and velocities for the vehicles based on the minimized values.

The control system 1000 includes a trajectory planner and tracker 1024 configured to determine states of the vehicles traveling within the sequencing and control zones. The trajectory planner and tracker 1024 is also configured to solve the optimal trajectory problem for determining motion trajectories for different vehicles according to the sequential arrival on the intersection while optimizing a metric of performance, such as energy consumption of the vehicles. For instance, the trajectory planner and tracker 1024 accesses motion trajectories of a vehicle (such as the vehicle 310) that are determined based on the intersection crossing times and velocities for the vehicle 310. The trajectory planner and tracker 1024 transmits the motion trajectories of the vehicle 310 to neighboring vehicles (such as the vehicle 312) so as to plan motion trajectory to cross the intersection (i.e. intersection 300) without colliding with each other. The traffic configuration 1018, the weight determining module 1020, the crossing time and velocity determining module 1022 and the trajectory planner and tracker 1024 are stored in storage 1026.

Figure 11A:
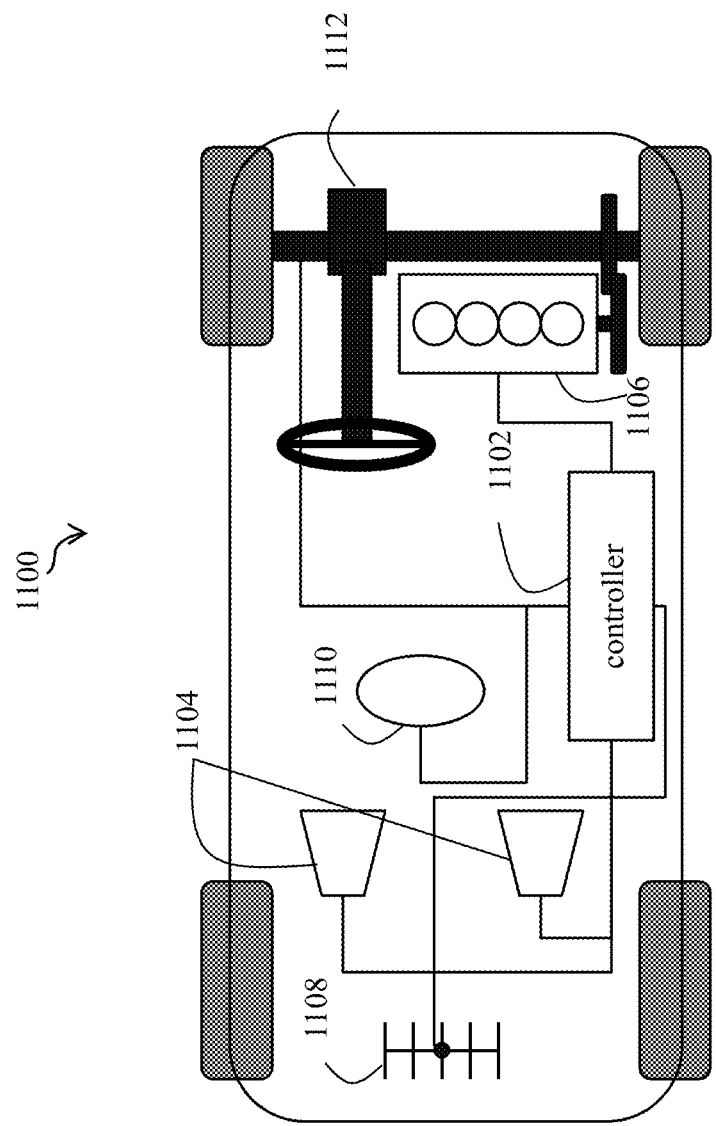
FIG. 11A shows a schematic of a vehicle including a controller in communication with the control system, according to some embodiments.

FIG. 11A shows a schematic of a vehicle 11000 including a controller 1102 in communication with control system, according to some embodiments.

The vehicle 1100 can be any type of wheeled vehicle, such as a passenger car, bus, or rover. Further, the vehicle 1100 can be an autonomous vehicle or a semi-autonomous vehicle.

In some implementations, motion of the vehicle 1100 is controlled. For example, lateral motion of the vehicle 1100 is controlled by a steering system 1112 of the vehicle 1100. In one embodiment, the steering system 1112 is controlled by the controller 1102. Additionally, or alternatively, the steering system 1112 can be controlled by a driver of the vehicle 1100.

Further, the vehicle 1100 includes an engine 1106, which may be controlled by the controller 1102 or by other components of the vehicle 1100. The vehicle 1100 may also include one or more sensors 1104 to sense surrounding environment of the vehicle 1100. Examples of the sensors 1104 include, but are not limited to, distance range finders, radars, lidars, and cameras. The vehicle 1100 may also include one or more sensors 1110 to sense current motion quantities and internal status, such as steering motion of the vehicle 1100, wheel motion of the vehicle 1100, and the like. Examples of the sensors 1110 include, but are not limited to, a global positioning system (GPS), accelerometers, inertial measurement units, gyroscopes, shaft rotational sensors, torque sensors, deflection sensors, a pressure sensor, and flow sensors. The vehicle 1100 may be equipped with a transceiver 1108 enabling communication capabilities of the controller 1102 through wired or wireless communication channels with control system (e.g., the control system 1000). For example, through the transceiver 1108, the controller 1102 receives the motion trajectory, and controls actuators and/or other controllers of the vehicle according to the received trajectory in order to control mobility of the vehicle 1100.

Figure 11B:
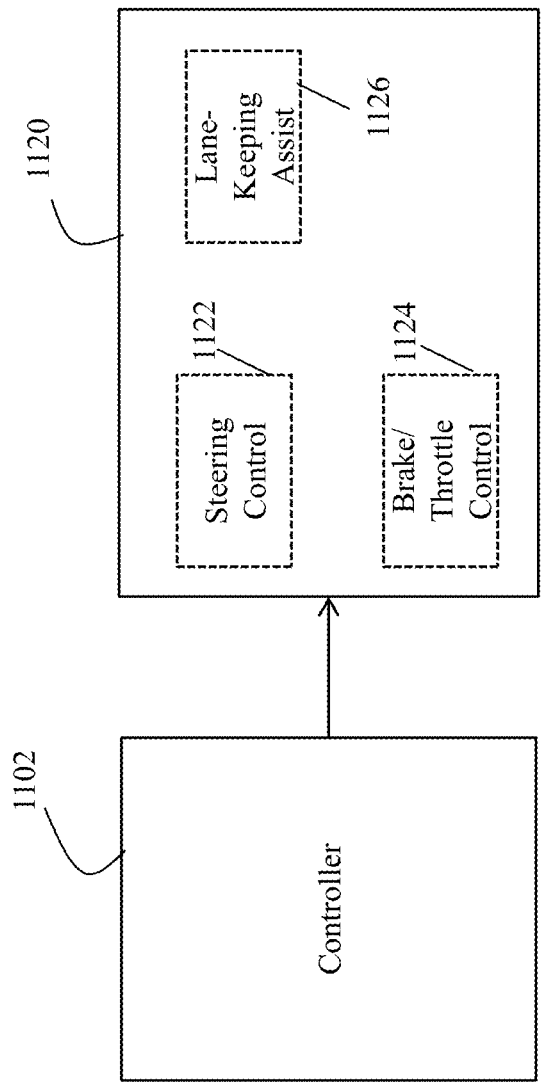
FIG. 11B shows a schematic of interaction between a set of control units of the vehicle for controlling vehicular mobility, according to some embodiments.

FIG. 11B shows a schematic of interaction between a set of control units 1120 of the vehicle 1100 for controlling vehicular mobility, according to some embodiments. For example, in some embodiments, the set of control units 1120 of the vehicle 1100 includes a steering control unit 1122 and brake/throttle control unit 1124 that control rotation and acceleration of the vehicle 1100. In such a case, the controller 1102 outputs control inputs to the control unit 1122 and the control unit 1124 to control the state of the vehicle 1100. Further, the set of control units 1120 may also include high-level controllers, e.g., a lane-keeping assist control unit 1126 that processes the control inputs of the controller 1102. In both cases, the set of control units 1120 utilizes outputs of the controller 1102 to control at least an actuator of the vehicle 1100 (such as the steering wheel and/or the brakes of the vehicle 1102) in order to control the motion of the vehicle 1100.

FIG. 11C shows a schematic for determining optimal trajectory 1132 for a vehicle 1134, according to some embodiments. The intersection 1130 is equipped with an IoV-Edge 1140, where the IoV-Edge corresponds to the IoV-Edge 302 as described in FIG. 3. The IoV-Edge 1140 provides intersection crossing time and velocity for the vehicle 1132 to cross the intersection 1130, as described in description of FIG. 4. The vehicle 1132 on road 1138 generates trajectory that aims to keep the vehicle 1132 within particular road bounds, and aims to avoid other uncontrolled vehicles, i.e., vehicles 1134 and 1142. In some embodiments, each of the vehicle 1134 and the vehicle 1142 can be represented by one or multiple inequality constraints in a time or space formulation of the mixed-integer optimal control problem, including one or multiple additional discrete variables for each of the obstacles. For example, based on embodiments configured to implement a mixed-integer model predictive controller, the autonomous or semi-autonomous controlled vehicle 1132 can make discrete decisions in real time such as, e.g., pass another vehicle on the left or on the right side or instead to stay behind another vehicle (i.e. the vehicle 1134) within the current lane of the road 1138.

In some embodiments, to control the vehicle 1132, the control inputs include commands specifying values of one or combination of a steering angle of the wheels of the vehicle 1132 and a rotational velocity of the wheels, and the measurements include values of one or combination of a rotation rate of the vehicle 1132 and an acceleration of the vehicle 1132. Each state of the vehicle 1132 includes a velocity and a heading rate of the vehicle 1132, such that the motion model relates the value of the control inputs to a first value of the state of the vehicle 1132 through dynamics of the vehicle 1132 at consecutive time instants, and the measurement model relates the value of the measurement to a second value of the state of the vehicle 1132 at the same time instant.

Figure 12:
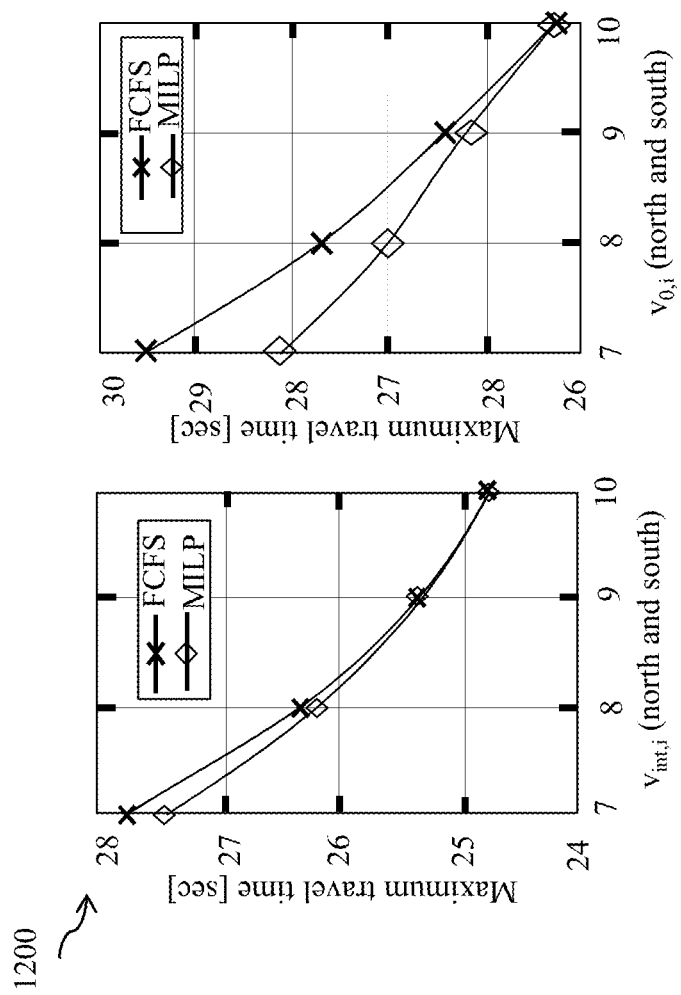
FIG. 12 shows a graphical representation depicting comparison of a maximum travel time with respect to an intersection crossing velocity and a maximum travel time with respect to an initial velocity of a vehicle entering control zone, according to some embodiments.

FIG. 12 shows a graphical representation 1200 depicting comparison of a maximum travel time with respect to an intersection crossing velocity and a maximum travel time with respect to an initial velocity of a vehicle entering control zone, according to some embodiments.

To define a baseline, a scheduling scheme based on first come first serve (FCFS) basis is adopted. The FCFS schedule time for vehicles to exit an intersection in an order. In an illustrative example, a vehicle, such as vehicle 804 of FIG. 8 enters the control zone 806 which is followed by the vehicle 802. In case of FCFS, the vehicle 802 is scheduled to cross the intersection 800 after the vehicle 804 exits the intersections. In case of scheduling based on MILP, vehicular mobility of the vehicles 802 and 804 is controlled by minimizing weighted maximum travel time of the vehicles 802 and 804, where the minimization procedure is described in description of FIG. 8. In FIG. 8, the vehicles, i.e. the vehicles 802 and 804 are travelling in north direction and south direction from 7 m/s to 10 m/s and the directional weight $w_{d_{(i)}}=1$.

As shown in FIG. 12, difference, between the maximum travel time with respect to the intersection crossing velocity and the maximum travel time with respect to the initial velocity based on MILP and FCFS, decreases as intersection crossing velocity or initial velocity increases. The MILP and FCFS scheduling are identical when the intersection crossing velocity and the initial velocity are equal for four directions. This is due to that FCFS scheduling yields an optimal solution when a vehicle (i.e. the vehicle 802 or 804) has the identical initial velocity and intersection crossing velocity. However, if the vehicles 802 and 804 have different initial velocity or intersection crossing velocity, FCFS scheduling is not optimal. Therefore, the MILP scheduling achieves shorter maximum travel time than the FCFS scheduling does. For instance, MILP scheduling can decrease the maximum travel time by up to 4.7% if the vehicles 802 and 804 traveling in the north and south directions have the initial velocity of 7 m/s while the vehicles in the east and west directions have the initial velocity of 10 m/s.

Figure 13:
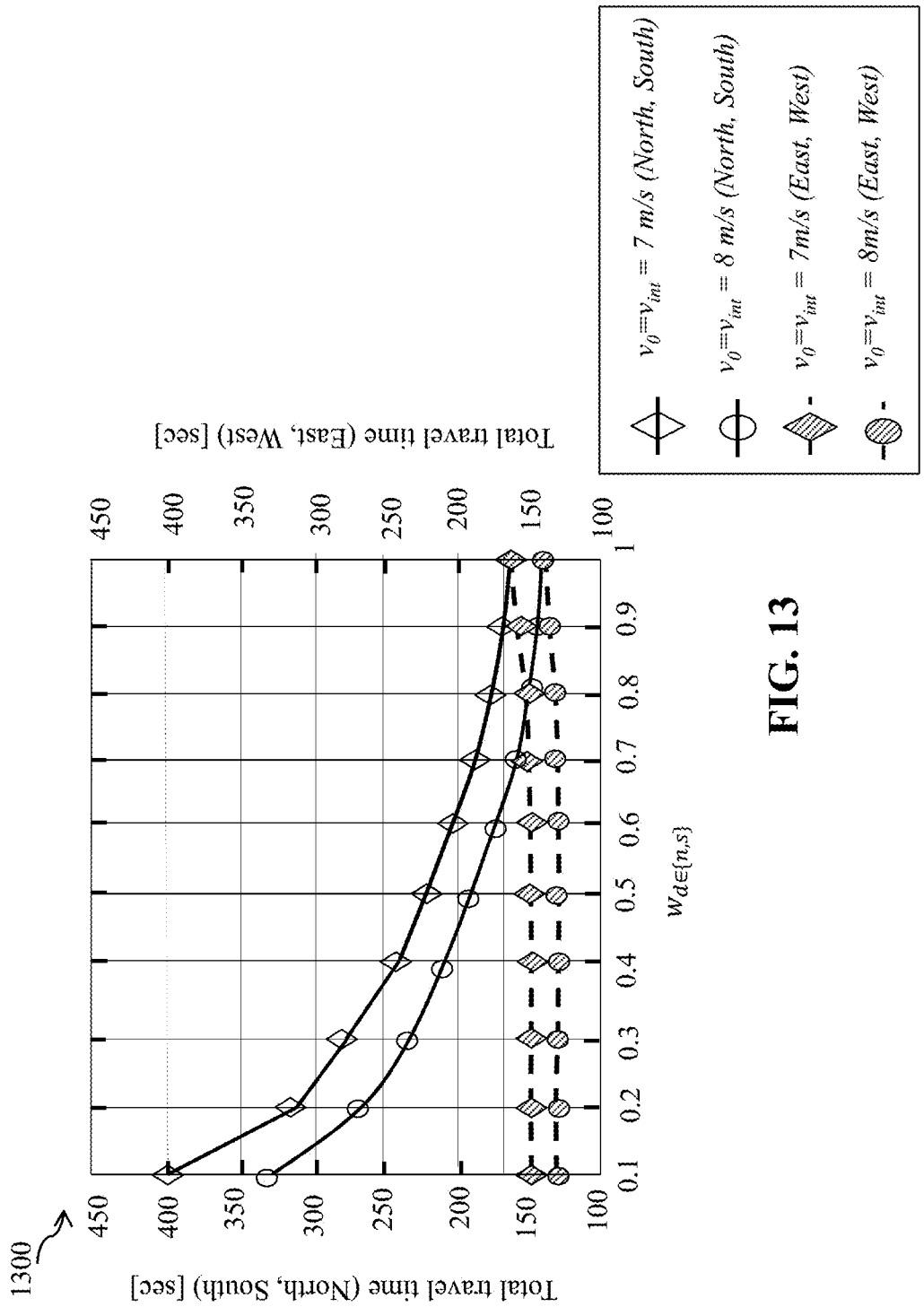
FIG. 13 shows a graphical representation depicting impact of weighting parameter in controlling traffic at interconnected intersections, according to some embodiments.

FIG. 13 shows a graphical representation 1300 depicting impact of weighting parameter in controlling traffic at interconnected intersections, according to some embodiments.

In FIG. 13, a total travel time of vehicles (e.g., the total time of travel of the vehicle 802 and the vehicle 804 as described in description of FIG. 8) in each direction for the different weighting values with an initial velocity and a reference velocity of 7 m/s and 8 m/s, respectively. The weighting values of the vehicle 802 and the vehicle 804 in north and south directions vary from 0.1 to 1, while $w_{d\in\{e,w\}}=1$, and $|I_d|=4$. It is observed that the total travel time of the vehicles in the north and south directions, i.e., $\Sigma_{i\in I_s\cup I_n}(t_{out}-t_0)$, increases when $w_{d\in\{n,s\}}$ decreases. In this case, a small value of $w_{d\in\{n,s\}}$ implies that next intersection is highly congested. Therefore, the vehicles traveling in north and south are delayed based on small weight $w_{d\in\{n,s\}}$, thus reducing the travel time of the vehicles in east and west directions. For instance, the gap between the vehicles in different directions, in terms of the total delay, can be roughly 63.3% when $w_{d\in\{n,s\}}=0.1$ and $v_{0,i}=v_{int,i}=7$ m/s.

Figure 14:
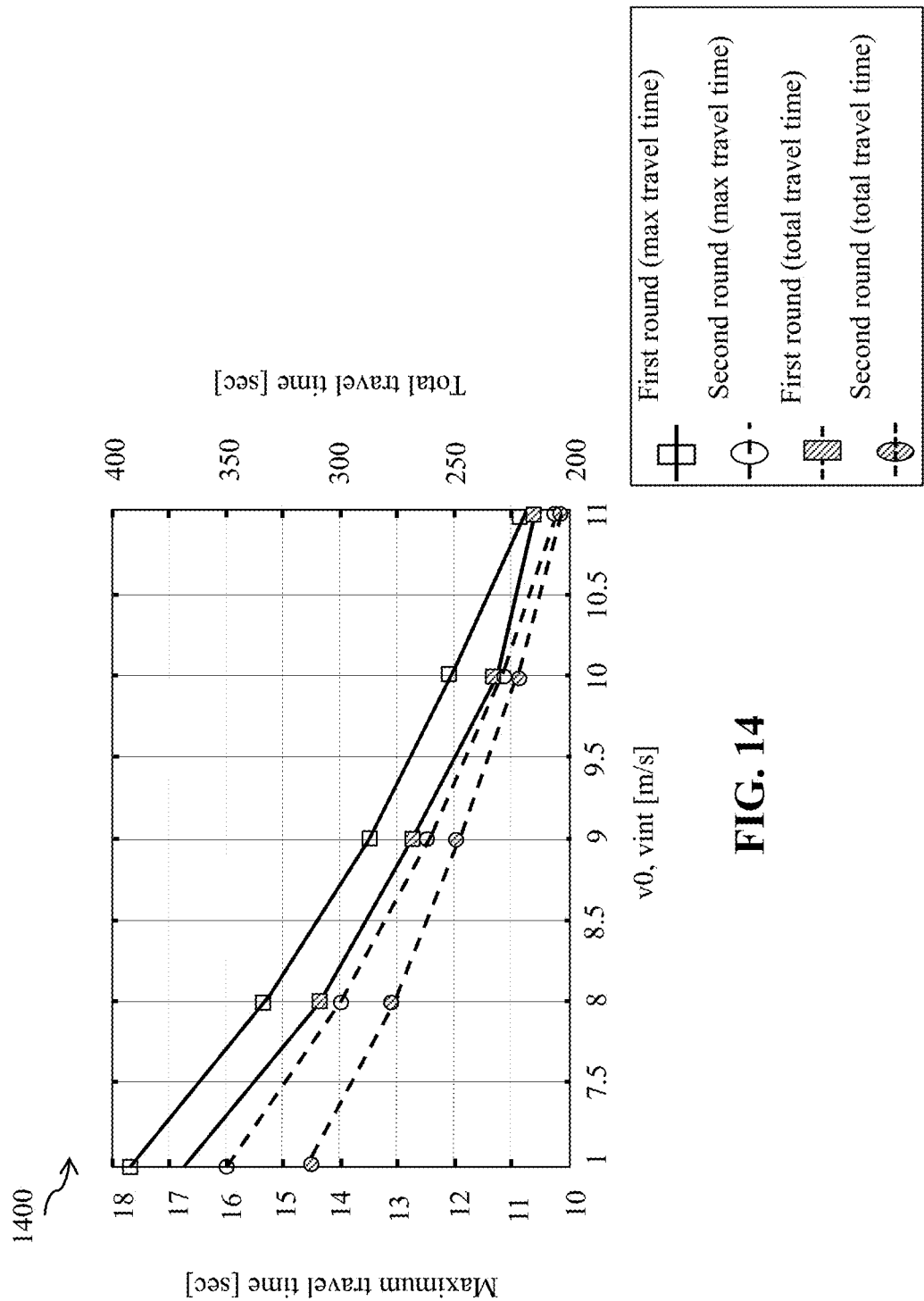
FIG. 14 shows a graphical representation depicting impact of neighboring intersections in controlling traffic at interconnected intersections, according to some embodiments.

FIG. 14 shows a graphical representation 1400 depicting impact of neighboring intersections in controlling traffic at interconnected intersections, according to some embodiments.

The neighboring intersections may correspond to the neighboring intersection 814 as described in description of FIG. 8. The graphical representation 1400 shows a maximum travel time and a total travel time of vehicles (e.g., the vehicle 802 and the vehicle 804) at an intersection (e.g., the intersection 800) during two consecutive simulation runs. The curves for maximum travel time and the total travel time are the plot of left-axis and right y-axis, respectively. It is shown in the FIG. 14, that the travel time decreases at velocity $v_0$ and increases at velocity $v_{int}$. Further, it is shown in the FIG. 14 that the maximum travel time and the total travel time in a second simulation round are reduced compared with a first simulation round. This is due to the fact that a small weighting value is applied to the vehicles traveling in the west and east directions. The vehicles with a small weighting value are delayed to exit the intersection in the first simulation round. When the vehicles arrive at the neighboring intersections, their late arrivals enable the neighboring IoV-Edges (e.g., the IoV edge 816) to schedule the vehicles in north and south directions with a priority. Therefore, the maximum travel time and total travel time of the vehicles at the next intersection can be reduced in the second simulation round. For example, the total travel time in the first simulation round can decrease by up to 14.3% in the second simulation round when $v_0=v_{int}=7$ m/s.

EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A traffic control system for controlling traffic at interconnected intersections of roads, comprising:
a receiver configured to receive traffic data indicative of states of vehicles approaching an intersection of the interconnected intersections and directions of the vehicles exiting the intersection;
a processor configured to determine intersection crossing times and velocities of vehicles approaching the intersection by minimizing at least one of a total travel time or a maximum travel time of the vehicles for crossing the intersection, wherein a contribution of each vehicle of the vehicles approaching the intersection in the at least one of a total travel time or a maximum travel time is weighted based on directions of the vehicles and traffic at next intersection along the directions, such that the minimization uses different weights for at least two different vehicles of the vehicles approaching the intersection; and
a transmitter configured to transmit the intersection crossing times and velocities to the vehicles exiting the intersection for controlling the traffic at the interconnected intersections.

2. The traffic control system of claim 1, wherein the traffic is controlled based on motion trajectories of the vehicles for exiting the intersection, the motion trajectories are determined based on the intersection crossing times and velocities of the vehicles approaching the intersection.

3. The traffic control system of claim 2, wherein the processor is configured to partition the roads approaching the intersection into sections based on the traffic data, the sections comprising a control zone adjacent to the intersection and a sequencing zone adjacent to the control zone, wherein the intersection crossing times and velocities of the vehicles are determined in the sequencing zone and wherein the motion trajectories for the vehicles are determined to travel in the control zone.

4. The traffic control system of claim 3, wherein the processor is configured to minimize the total travel time of vehicles or the maximum travel time of vehicles in the sequencing zone with the intersection crossing times and velocities of the vehicles fixed in the control zone.

5. The traffic control system of claim 4, wherein the processor performs the minimization by solving a mixed integer linear problem (MILP), the MILP simulates motion of the vehicles crossing the intersection subject to a reference velocity corresponding to safety requirement and traffic regulation.

6. The traffic control system of claim 3, wherein the processor is configured to determine length of the sequencing zone and length of the control zone, the sequencing zone length is a function of a computational speed of the processor and wherein the control zone length corresponds to a distance needed to decelerate a maximum allowed speed of a vehicle entering the control zone or accelerate the vehicle from a control zone entering velocity to the maximum allowed speed.

7. The traffic control system of claim 3, wherein the traffic control system exchanges information with each vehicle of vehicles in the sequencing zone and the control using a zone-based communication protocol comprising:
transmitting information of the sequencing zone to the vehicle;
receiving a state of the vehicle arriving at the sequencing zone, the state of the vehicle comprising a location of the vehicle, a velocity of the vehicle and an acceleration of the vehicle;
transmitting an intersection crossing time and velocity for exiting the intersection to the vehicle before entering the control zone;
transmitting information about preceding vehicle to the vehicle;
receiving motion trajectory of the vehicle to be applied in the control zone;
transmitting the vehicle motion trajectory to next vehicle;
transmitting traffic data of the intersection to the next intersection; and
transmitting zone information of the next intersection to the vehicle.

8. The traffic control system of claim 1, wherein the weight of the vehicle is based on the traffic at the next intersection towards a direction of the vehicle exiting the intersection.

9. The traffic control system of claim 8, wherein the traffic at the next intersection is traffic formed by motion of vehicles intersecting the direction of the vehicle.

10. The traffic control system of claim 9, wherein directional weight of a vehicle i is determined according to $$w_{d(i)} = \frac{N - N_{d(i)^\perp}}{N} W_i$$

wherein d(i) is direction of the vehicle approaching the intersection; N is total number of vehicles at the next intersection after crossing the intersection; $d(i)^\perp$ is direction perpendicular to the direction d(i); $N_{d(i)^\perp}$ is number of vehicles in the direction $d(i)^\perp$ at the next intersection after crossing the intersection; and $W_i$ is a physical weight coefficient to reflect vehicle features.

11. The traffic control system of claim 1, wherein the traffic control system is arranged on an edge device placed in proximity of each intersection of the interconnected intersections, the edge device comprises a set of sensors to collect the traffic data, wherein the processor is configured to perform the determination of the intersection crossing times and velocities of the vehicles entering the intersection and the minimization based on the traffic data.

12. A method for controlling traffic at interconnected intersections of roads, wherein the method uses a processor coupled to a receiver configured to receive traffic data indicative of states of vehicles approaching an intersection of the interconnected intersections and directions of the vehicles exiting the intersection, wherein the processor is coupled with stored instructions implementing the method, wherein the instructions, when executed by the processor carry out step of the method, comprising:
determining intersection crossing times and velocities of the vehicles approaching the intersection by minimizing at least one of a total travel time or a maximum travel time of the vehicles for crossing the intersection, wherein a contribution of each vehicle of the vehicles approaching the intersection in the total travel time or the maximum travel time is weighted based on the directions of the vehicles and traffic at next intersection, such that the minimization uses different weights for at least two different vehicles of the vehicles approaching the intersection; and
transmitting the intersection crossing times and velocities to the vehicles exiting the intersection via a transmitter coupled to the processor for controlling the traffic at the interconnected intersections.

13. The method of claim 12, wherein the traffic is controlled based on motion trajectories of the vehicles for exiting the intersection, the motion trajectories are determined based on the intersection crossing times and velocities of the vehicles approaching the intersection.

14. The method of claim 13, further comprising:
partitioning the roads approaching the intersection into sections based on the traffic data, the sections comprising a control zone adjacent to the intersection and a sequencing zone adjacent to the control zone, wherein the intersection crossing times and velocities of the vehicles are determined in the sequencing zone subject to intersection crossing times and velocities of the vehicles in the control zone.

15. The method of claim 14, further comprising:
minimizing the total travel time or the maximum travel time of vehicles in the sequencing zone with the intersection crossing times and velocities of the vehicles fixed in the control zone.

16. The method of claim 15, wherein the minimization comprising:
solving a mixed integer linear problem (MILP), the MILP simulates motion of the vehicles crossing the intersection subject to a reference velocity corresponding to safety requirement and traffic regulations.

17. The method of claim 14, wherein partitioning the roads comprising determining length of the sequencing zone and length of the control zone, wherein the sequencing zone length is function of a computational speed of the processor and wherein the control zone length corresponds to a distance needed to decelerate a maximum allowed speed of a vehicle entering the control zone or accelerate the vehicle from a control zone entering velocity to the maximum allowed speed.

18. The method of claim 14, further comprising exchanging information with each vehicle of vehicles in the sequencing zone and the control zone using a zone-based communication protocol comprising:
transmitting information of the sequencing zone to the vehicle;
receiving a state of the vehicle arriving at the sequencing zone, the state of the vehicle comprising a location of the vehicle, a velocity of the vehicle and an acceleration of the vehicle;
transmitting an intersection crossing time and a velocity for exiting the intersection to the vehicle before entering the control zone;
transmitting information about preceding vehicle to the vehicle;
receiving motion trajectory of the vehicle to be applied in the control zone;
transmitting the vehicle motion trajectory to next vehicle;
transmitting traffic data of the intersection to the next intersection; and
transmitting zone information of the next intersection to the vehicle.

19. The method of claim 13, wherein the weight of the vehicle is based on the traffic at the next intersection towards a direction of the vehicle exiting the intersection, the traffic at the next intersection is traffic formed by motion of vehicles intersecting the direction of the vehicle and wherein directional weight of a vehicle i is determined according to $$w_{d(i)} = \frac{N - N_{d(i)^\perp}}{N} W_i$$

wherein d(i) is direction of the vehicle approaching the intersection; N is total number of vehicles at the next intersection after crossing the intersection; $d(i)^\perp$ is direction perpendicular to the direction $d(i)$; $N_{d(i)}^\perp$ is number of vehicles in the direction $d(i)^\perp$ at the next intersection after crossing the intersection; and $W_i$ is a physical weight coefficient to reflect vehicle features.

20. A non-transitory computer readable storage medium embodied thereon a program executable by a processor for performing a method, the method comprising:
receiving traffic data indicative of states of vehicles approaching an intersection of the interconnected intersections and directions of the vehicles exiting the intersection;
determining intersection crossing times and velocities of the vehicles approaching the intersection by minimizing at least one of a total travel time or a maximum travel time of the vehicles crossing the intersection, wherein a contribution of each vehicle in the total travel time or the maximum travel time is weighted based on the directions of the vehicles and traffic at next intersection, such that the minimization uses different weights for at least two different vehicles of the vehicles approaching the intersection; and
transmitting the intersection crossing times and velocities to the vehicles exiting the intersection via a transmitter coupled to the processor, for controlling the traffic at the interconnected intersections.

* * * * *